(12) United States Patent
Pan et al.

(10) Patent No.: US 8,036,158 B2
(45) Date of Patent: *Oct. 11, 2011

(54) SYSTEM, METHOD, AND DEVICE FOR PROVIDING COMMUNICATIONS USING A DISTRIBUTED MOBILE ARCHITECTURE

(75) Inventors: Shaowei Pan, Kildeer, IL (US); Nicholas Labun, Chicago, IL (US)

(73) Assignee: Lemko Corporation, Schaumburg, IL (US)

( * ) Notice: Subject to any disclaimer, the term of this patent is extended or adjusted under 35 U.S.C. 154(b) by 1008 days.

This patent is subject to a terminal disclaimer.

(21) Appl. No.: 11/858,762

(22) Filed: Sep. 20, 2007

(65) Prior Publication Data
US 2008/0039144 A1   Feb. 14, 2008

Related U.S. Application Data

(62) Division of application No. 11/104,925, filed on Apr. 13, 2005, now Pat. No. 7,486,967.

(51) Int. Cl.
*H04W 4/00* (2009.01)
(52) U.S. Cl. .................................. 370/328
(58) Field of Classification Search ........... 455/560, 455/414.1, 417, 550, 439, 432.1–432.3, 433, 455/435.1, 43, 466, 412.1–412.2, 461, 445, 455/426, 419, 415, 561, 519, 518, 68, 66.1, 455/67.11, 411, 25, 428; 370/342, 328, 316, 370/401, 338, 465; 709/212; 726/4
See application file for complete search history.

(56) References Cited

U.S. PATENT DOCUMENTS

| 4,284,848 | A | * | 8/1981 | Frost | 455/465 |
| 5,590,175 | A | * | 12/1996 | Gallant et al. | 455/433 |
| 5,623,495 | A | * | 4/1997 | Eng et al. | 370/397 |
| 5,734,979 | A | * | 3/1998 | Lu et al. | 455/445 |
| 6,122,499 | A | * | 9/2000 | Magnusson | 455/405 |
| 6,141,564 | A | * | 10/2000 | Bruner et al. | 455/558 |
| 6,411,825 | B1 | * | 6/2002 | Csapo et al. | 455/561 |
| 6,421,325 | B1 | * | 7/2002 | Kikinis | 370/280 |
| 6,515,985 | B2 | * | 2/2003 | Shmulevich et al. | 370/356 |
| 6,539,237 | B1 | * | 3/2003 | Sayers et al. | 455/555 |
| 6,584,098 | B1 | * | 6/2003 | Dutnall | 370/354 |

(Continued)

FOREIGN PATENT DOCUMENTS
EP     0365885 A2    5/1990

OTHER PUBLICATIONS

Non-Final Office Action for U.S. Appl. No. 11/104,925 from the United States Patent and Trademark Office (USPTO), dated Aug. 21, 2006, 14 pages.

(Continued)

*Primary Examiner* — Melody Mehrpour
(74) *Attorney, Agent, or Firm* — Toler Law Group, IP

(57) ABSTRACT

A device for providing a communication path between two or more wireless telephones via one or more wireless transceivers is disclosed. The device includes a housing that includes a mobile switching center module and includes a base station controller module. Further, in another particular embodiment, the mobile switching center module includes a program for switching received telephone calls. Additionally, the mobile switching center module includes a program to establish a peer-to-peer connection with a remote distributed mobile architecture server. The mobile switching center module further includes a program to transmit telephone calls to a remote distributed mobile architecture server via one or more peer-to-peer Internet protocol connections.

24 Claims, 23 Drawing Sheets

U.S. PATENT DOCUMENTS

| | | | |
|---|---|---|---|
| 6,611,533 B1* | 8/2003 | Liao et al. | 370/467 |
| 6,614,784 B1* | 9/2003 | Glitho et al. | 370/352 |
| 6,647,426 B2* | 11/2003 | Mohammed | 709/238 |
| 6,678,155 B1* | 1/2004 | Bresniker | 361/679.49 |
| 6,694,134 B1* | 2/2004 | Lu et al. | 455/419 |
| 6,704,409 B1* | 3/2004 | Dilip et al. | 379/265.02 |
| 6,751,207 B1* | 6/2004 | Lee et al. | 370/338 |
| 6,760,325 B1* | 7/2004 | Hameleers et al. | 370/352 |
| 6,763,226 B1 | 7/2004 | McZeal, Jr. | |
| 6,763,233 B2 | 7/2004 | Bharatia | |
| 6,791,988 B1 | 9/2004 | Hameleers et al. | |
| 6,795,444 B1 | 9/2004 | Vo et al. | |
| 6,807,431 B2* | 10/2004 | Sayers et al. | 455/555 |
| 6,816,706 B1* | 11/2004 | Hohnstein et al. | 455/25 |
| 6,819,652 B1 | 11/2004 | Akhtar et al. | |
| 6,831,903 B2 | 12/2004 | Kang | |
| 6,839,356 B2 | 1/2005 | Barany et al. | |
| 6,859,652 B2 | 2/2005 | Karabinis et al. | |
| 6,871,072 B1* | 3/2005 | Meche | 455/445 |
| 6,879,582 B1 | 4/2005 | Dhara et al. | |
| 6,879,677 B2 | 4/2005 | Trandal et al. | |
| 6,917,813 B2 | 7/2005 | Elizondo | |
| 6,958,983 B2 | 10/2005 | Musikka et al. | |
| 7,050,414 B2 | 5/2006 | Lin | |
| 7,072,650 B2 | 7/2006 | Stanforth | |
| 7,120,435 B2 | 10/2006 | Usher et al. | |
| 7,136,651 B2* | 11/2006 | Kalavade | 455/445 |
| 7,299,039 B2 | 11/2007 | Lee et al. | |
| 7,313,399 B2 | 12/2007 | Rhee et al. | |
| 7,324,478 B2 | 1/2008 | Park et al. | |
| 7,349,412 B1 | 3/2008 | Jones et al. | |
| 7,539,158 B2 | 5/2009 | Pan | |
| 2001/0036173 A1* | 11/2001 | Shmulevich et al. | 370/352 |
| 2001/0055298 A1 | 12/2001 | Baker et al. | |
| 2002/0045444 A1 | 4/2002 | Usher et al. | |
| 2002/0058502 A1* | 5/2002 | Stanforth | 455/422 |
| 2002/0169887 A1 | 11/2002 | MeLampy et al. | |
| 2003/0063721 A1 | 4/2003 | Hirose | |
| 2003/0100342 A1 | 5/2003 | Ham et al. | |
| 2003/0153343 A1* | 8/2003 | Crockett et al. | 455/519 |
| 2003/0198325 A1 | 10/2003 | Bayne | |
| 2004/0014466 A1 | 1/2004 | Jesse et al. | |
| 2004/0018829 A1* | 1/2004 | Raman et al. | 455/406 |
| 2004/0019539 A1 | 1/2004 | Raman et al. | |
| 2004/0156495 A1 | 8/2004 | Chava et al. | |
| 2004/0204097 A1 | 10/2004 | Scheinert et al. | |
| 2004/0253949 A1 | 12/2004 | Swensen et al. | |
| 2004/0259556 A1 | 12/2004 | Czys | |
| 2006/0046760 A1 | 3/2006 | Bertino et al. | |
| 2006/0203746 A1 | 9/2006 | Maggenti et al. | |
| 2006/0234747 A1* | 10/2006 | Pan | 455/519 |
| 2007/0202847 A1* | 8/2007 | Pan | 455/411 |
| 2007/0232267 A1* | 10/2007 | Pan | 455/411 |
| 2007/0287452 A1* | 12/2007 | Pan | 455/435.1 |
| 2008/0039144 A1 | 2/2008 | Pan et al. | |
| 2008/0146158 A1* | 6/2008 | Pan et al. | 455/66.1 |
| 2009/0227235 A1* | 9/2009 | Pan | 455/411 |
| 2009/0271491 A1* | 10/2009 | Pan | 709/212 |
| 2009/0325584 A1* | 12/2009 | Pan | 455/445 |
| 2009/0327819 A1 | 12/2009 | Pan | |
| 2010/0008306 A1 | 1/2010 | Pan | |
| 2010/0008369 A1* | 1/2010 | Pan | 370/401 |
| 2010/0075668 A1* | 3/2010 | Pan | 455/433 |

OTHER PUBLICATIONS

Final Office Action for U.S. Appl. No. 11/104,925 from the United States Patent and Trademark Office (USPTO), dated May 17, 2007, 10 pages.

Non-Final Office Action for U.S. Appl. No. 11/104,925 from the United States Patent and Trademark Office (USPTO), dated Aug. 27, 2007, 9 pages.

Final Office Action for U.S. Appl. No. 11/104,925 from the United States Patent and Trademark Office (USPTO), dated Nov. 14, 2007, 18 pages.

Non-Final Office Action for U.S. Appl. No. 11/104,925 from the United States Patent and Trademark Office (USPTO), dated May 13, 2008, 15 pages.

Notice of Allowance and Fee(s) Due for U.S. Appl. No. 11/104,925 from the United States Patent and Trademark Office (USPTO), dated Dec. 12, 2008, 4 pages.

Hoffpauir et al., United States Statutory Invention Registration No. H1,918 published Nov. 7, 2000, 19 pages.

* cited by examiner

SYSTEM, METHOD, AND DEVICE FOR PROVIDING COMMUNICATIONS USING A DISTRIBUTED MOBILE ARCHITECTURE

CLAIM OF PRIORITY

This application is a divisional application of, and claims priority from, U.S. application Ser. No. 11/104,925, filed Apr. 13, 2005, the contents of which are hereby incorporated in their entirety.

FIELD OF THE DISCLOSURE

The present disclosure relates generally to the distributed mobile communication systems.

BACKGROUND

Access to basic telephony service is particularly important for rural and isolated communities. Telephony access allows small-scale enterprises, cooperatives, and farmers to obtain accurate information on fair prices for their products and to access regional and national markets. Access also reduces the cost of transportation and supports the local tourist industry. By bringing markets to people via telecommunications, rather than forcing people to leave in search of markets, urban migration is reduced and greater income and employment potential are generated in rural areas.

Unfortunately, the last decade of the telecommunications boom has not alleviated the disparities between urban and rural communities. The average imbalance, in terms of telephone penetration, in Asia, for example, is over ten to one and is often as high as twenty to 1.2. This means that a country whose urban markets have a penetration of four (4) telephone lines per one-hundred (100) inhabitants, e.g., India and Pakistan, has a rural penetration of less than 0.2 per one-hundred (100). The situation is more acute in most African countries and in some parts of Latin America. By comparison, the disparity in average income level between urban and rural residents in the developing world is usually less than 4 to 1.

Current telephone systems are expensive to deploy. For example, a typical cellular system that includes a mobile switching center (MSC), a base station controller (BSC), and a home location register/visitor location register (HLR/VLR) can cost over $2.0 million. Moreover, such a system may require a minimum of ten thousand users in order to be economically viable. In many rural areas, the population is not large enough to support the installation of such a system. Further, in many cases, the conditions in which the equipment, e.g., the MSC, BSC, and HLR/VLR, are to be operated are extremely harsh and environmentally prohibitive. An alternative to such a cellular system can include a wired system, but the costs associated with deploying and maintaining land lines are too high for certain rural areas.

Accordingly, there exists a need for an improved communications system that is relatively inexpensive to deploy and relatively inexpensive to operate.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
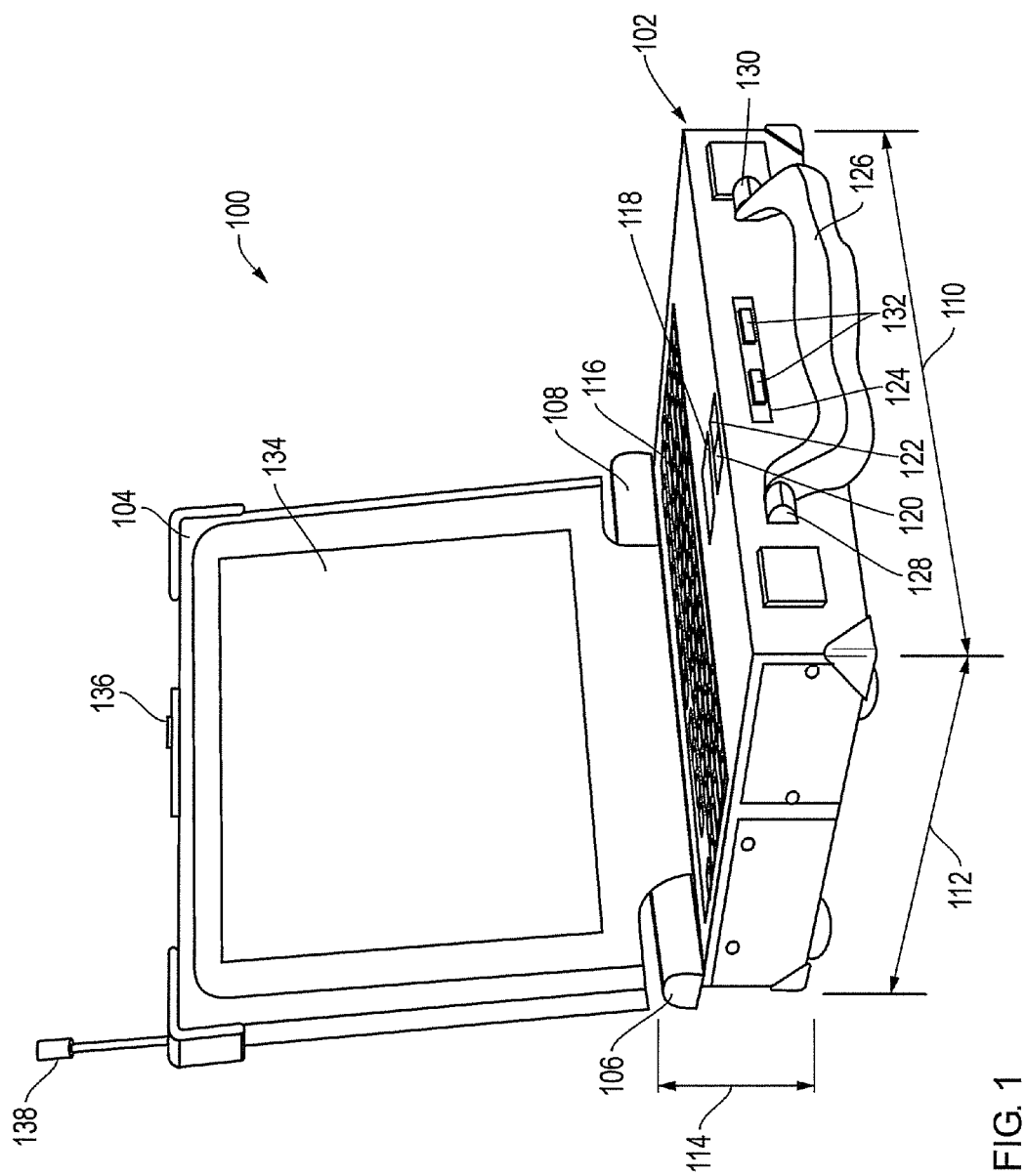
FIG. 1 is a view of a distributed management architecture server having a first illustrative form factor.

A device for providing a communication path between two or more wireless telephones via one or more wireless transceivers is disclosed and has volume less than 150,000 centimeters cubed. In a particular embodiment, the device includes a housing that includes a mobile switching center module and includes a base station controller module. Further, in another particular embodiment, the mobile switching center module includes a program for switching received telephone calls. Additionally, the mobile switching center module includes a program to establish a peer-to-peer connection with a remote distributed mobile architecture server. The mobile switching center module further includes a program to transmit telephone calls to a remote distributed mobile architecture server via one or more peer-to-peer Internet protocol connections.

In another particular embodiment, the base station controller module includes a program to manage one or more radio resources of one of the wireless transceivers. In still another particular embodiment, the device has a volume less than 16,000 centimeters cubed. In yet another particular embodiment, the device has a volume less than 6,000.0 centimeters cubed.

In another embodiment, a device for providing a communication path between two or more wireless telephones via one or more wireless transceivers is disclosed and weighs approximately 50 kilograms.

In yet another embodiment, a portable computer device is disclosed and includes an interface configured for direct physical connection to a base transceiver station. In this embodiment, the portable computer device provides a call routing function between a first wireless communication and a second wireless communication subscriber.

In still another embodiment, a portable computer device is disclosed and is directly coupled to a base transceiver station. In this embodiment, the portable computer device includes a base station controller.

In yet still another embodiment, a device for providing a communication path between two or more wireless telephones via one or more wireless transceivers is disclosed and includes a base, a lid coupled to the base, and a display incorporated into the lid.

In another embodiment, a device for providing a communication path between two or more wireless telephones via one or more wireless transceivers is disclosed and includes a housing. In this embodiment, a mobile switching center module is within the housing. Further, in this embodiment, a base station controller module is within the housing.

In still another embodiment, a method for deploying a distributed management architecture server is disclosed and includes establishing a direct physical connection between the distributed management architecture server and a base transceiver station, activating the distributed management architecture server, and establishing a network connection with respect to the distributed management architecture server.

In still yet another embodiment, a method of replacing a distributed management architecture server is disclosed and includes disconnecting a direct physical connection between a first distributed management architecture server and a base transceiver station, and establishing a direct physical connection between a second distributed management architecture server and the base transceiver station.

In another embodiment, a communications system is disclosed and includes a non land-based vehicle. In this embodiment, a satellite transceiver is deployed within the at least one non land-based vehicle and a base transceiver station is deployed within the at least one non land-based vehicle. Further, in this embodiment, a distributed mobile architecture server is coupled to the base transceiver station and is coupled to the satellite transceiver. The distributed mobile architecture server includes a mobile switching center module and a base station controller module that is disposed within the same housing.

Referring to FIG. 1, a distributed management architecture (DMA) server is shown and is generally designated 100. As illustrated in FIG. 1, the DMA server 100 includes a base 102 and a lid 104. As shown, the lid 104 is attached to the base by a first lid hinge 106 and a second lid hinge 108. In a particular embodiment, the lid 104 can be rotated about the first lid hinge 106 and the second lid hinge 108 between an open position, shown in FIG. 1, and a closed position (not shown) in which the lid 104 overlays the base 102 and the DMA server 100 is essentially shaped like a box or a briefcase.

As indicated in FIG. 1, the base 102 has a length 110, a width 112 and a height 114. FIG. 1 shows that the DMA server 100 includes a keyboard input device 116 that is incorporated in an upper surface of the base 102. Further, the DMA server 100 includes a mouse input device 118 that is also incorporated into the upper surface of the base 102. In a particular embodiment, the mouse input device 118 is a touch mouse input device 118. Additionally, the DMA server 100 includes a right side button 120 and a left side button 122. In a particular embodiment, the right side button 120 can be used to perform right-click functionality associated with the mouse input device 118. Moreover, the left side button 122 can be used to perform left-click functionality associated with the mouse input device 118.

FIG. 1 further indicates that the base 102 of the DMA server 100 is formed with a vent 124 to permit air exchange with the interior of the base 102 of the DMA server 100 and to facilitate cooling of the electronic components of the DMA server 100 housed within the base 102. Moreover, the base 102 of the DMA server 100 includes a handle 126 that is attached to the base 102 via a first handle hinge 128 and a second handle hinge 130. The base 102 also includes a pair of latch engagement notches 132.

As shown in FIG. 1, the lid 104 includes a flat panel display 134 incorporated therein. When the lid 104 is closed, the display 134 is adjacent to the keyboard 116. Moreover, when the lid 104 is closed, the lid 104 and the base 102 cooperate to protect the display 134, the keyboard 116, the mouse 118, and the buttons 120, 122. FIG. 1 also depicts a latch 136 that is incorporated into the lid 104. When the lid 104 is closed, the latch 136 can engage the latch engagement notches 132 in order to lock the lid in the closed position. As depicted in FIG. 1, an antenna 138 is incorporated into the lid 104. The antenna 138 can be extended during operation and retracted when the DMA server 100 is not operating.

In a particular embodiment, the length 110 of the base 102 is 31.0 centimeters. Further, in a particular embodiment, the width 112 of the base 102 is 25.5 centimeters. Additionally, in a particular embodiment, the height 114 of the base 102 with the lid 104 in the closed position is 7.0 centimeters. Accordingly, the DMA server 100 has a total volume of 5,533.5 centimeters cubed and a footprint area of 790.5 centimeters squared. Further, in a particular embodiment, the DMA server 100 weighs approximately 5.8 kilograms (kg). As such, in a particular embodiment, the DMA server 100 has a total volume that is less than 6,000 centimeters cubed, a footprint area that is less than 800 centimeters squared, and a weight that is less than 6.0 kilograms.

In a particular embodiment, the DMA server 100 is relatively rugged. Particularly, the DMA server 100 is operable in a temperature range from negative twenty degrees Celsius to positive fifty-five degrees Celsius (−20° C. to 55° C.). Also, the DMA server 100 is substantially shock resistant and can withstand a one meter drop. Further, the DMA server 100 is substantially weather resistant, substantially dust resistant, and substantially sand resistant. The DMA server 100 is portable and it can be mounted in a vehicle or carried like a brief case. Further, multiple DMA servers 100 can be deployed as described herein.

Figure 2:
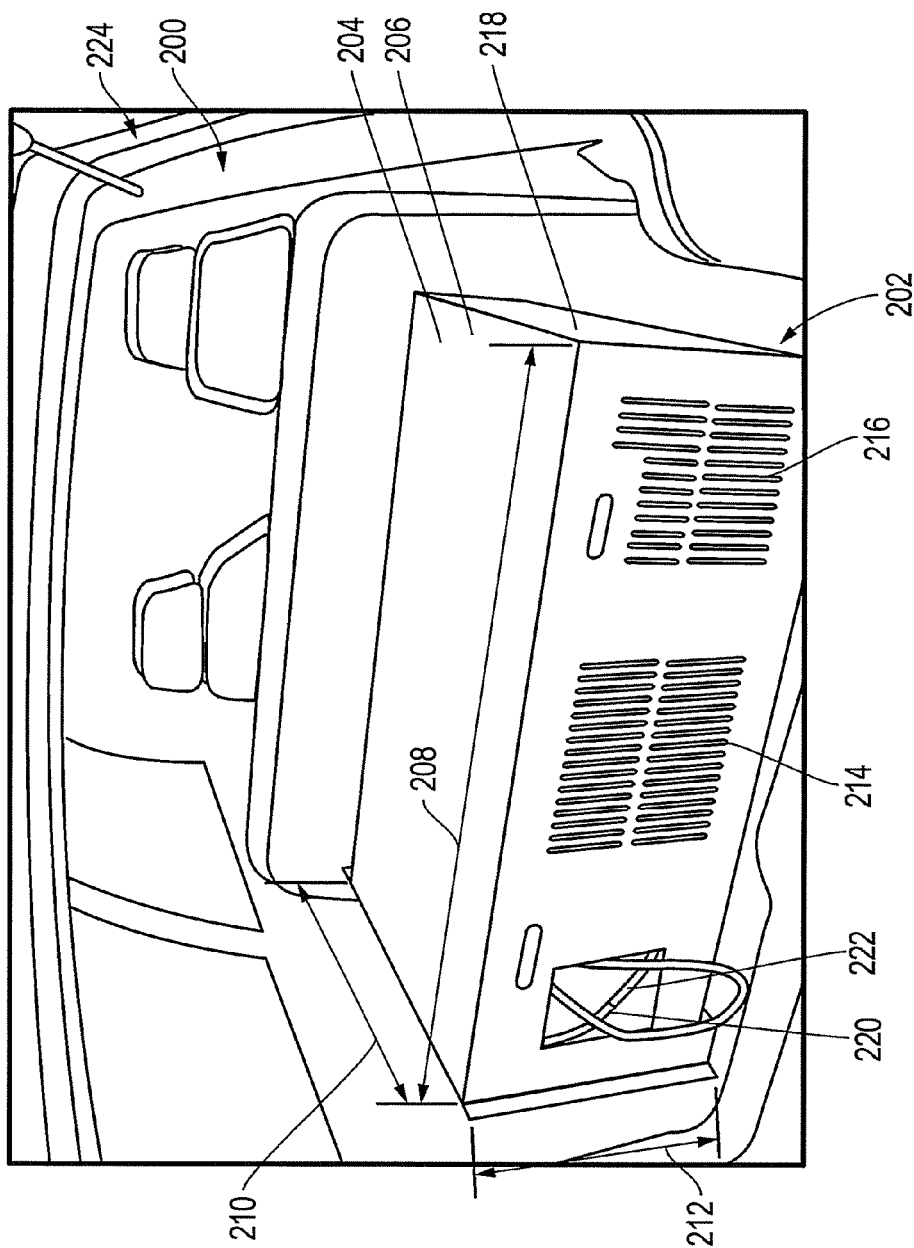
FIG. 2 is a view of an alternative embodiment of a distributed management architecture server having a second illustrative form factor.

FIG. 2 depicts an alternative embodiment of a distributed management architecture (DMA) server that is generally designated 200. As shown in FIG. 2, the DMA server 200 includes a base 202 and a lid 204 that is coupled to the base 202 via a plurality of fasteners 206, e.g., a plurality of screws. Additionally, the DMA server 200 has a length 208, a width 210, and a height 212. Further, the base 202 of the DMA server 200 includes a first vent 214, a second vent 216, and a third vent 218. In a particular embodiment, the vents 214, 216, 218 permit air exchange with the interior of the base 202 of the DMA server 200 and facilitate cooling of the electronic components of the DMA server 200 housed within the base 202. As shown in FIG. 2, the DMA server 200 includes an access window 220. One or more interfaces 222, e.g., wires can be accessed via the access window 220 and coupled to a base transceiver station (BTS) during deployment of the DMA server 200. As shown in FIG. 2, the DMA server 200 can be mounted within a vehicle 224. Further, multiple DMA servers 200 can be deployed as described herein.

In a particular embodiment, the length 208 of the base 202 is 92.0 centimeters. Further, in a particular embodiment, the width 210 of the base 202 is 45.0 centimeters. Additionally, in a particular embodiment, the height 212 of the base 202 is 34.0 centimeters. Accordingly, the DMA server 200 has a total volume of approximately 140,760 centimeters cubed and a footprint area of approximately 4,140 centimeters squared. Further, in a particular embodiment, the DMA server 200 weighs approximately 48 kilograms (kg). As such, in a particular embodiment, the DMA server 100 has a total volume that is less than 150,000 centimeters cubed, a footprint area that is less than 5,000 centimeters squared, and a weight that is less than 50.0 kilograms.

Figure 3:
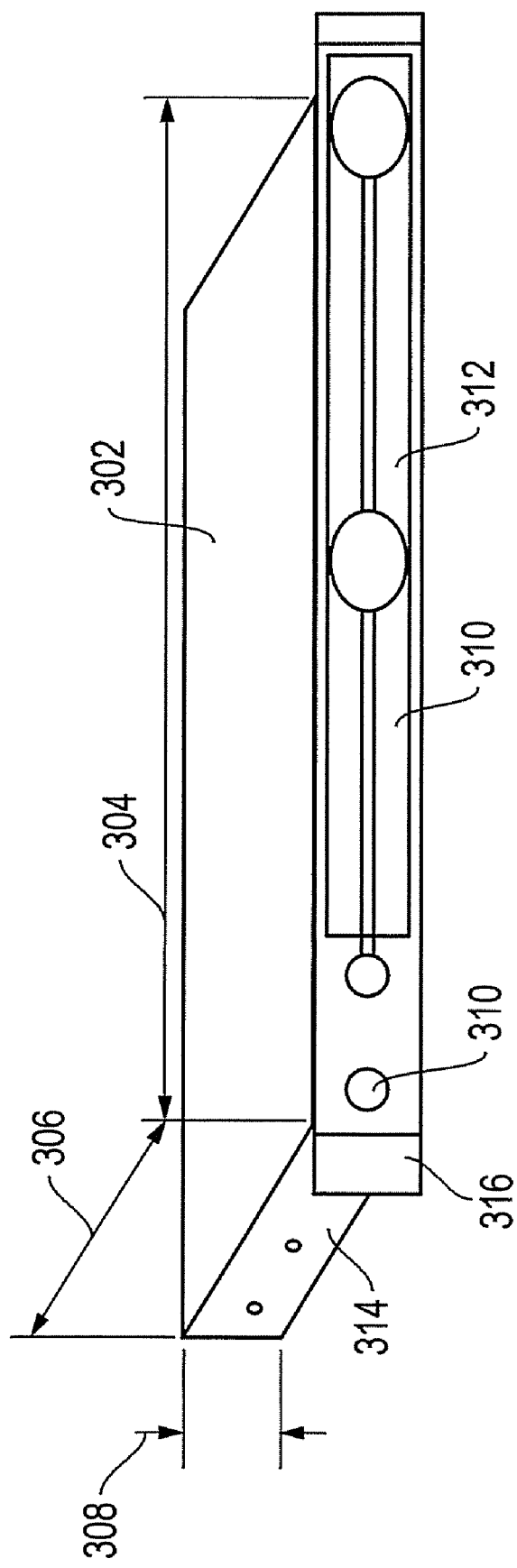
FIG. 3 is a diagram of another alternative embodiment of a distributed management architecture server having a third illustrative form factor.

FIG. 3 illustrates another alternative embodiment of a distributed management architecture (DMA) server that is generally designated 300. As depicted in FIG. 3, the DMA server 300 includes a housing 302 that has a length 304, a width 306, and a height 308. Additionally, the housing 302 can be formed with a first vent 310 and a second vent 312. In a particular embodiment, the vents 310, 312 permit air exchange with the interior of the housing 302 of the DMA server 300 and facilitate cooling of the electronic components of the DMA server 300 within the housing 302.

As shown in FIG. 3, at least one side of the housing 302 is formed with a rib 314 to allow the DMA server 300 to be slid into a server rack (not shown). Further, the DMA server 300 includes a clip 316 that is coupled to the housing 302 via a fastener, e.g., a bolt. The clip 316 can be engaged with a server rack (not shown) to prevent the DMA server 300 from unintentionally sliding out of the server rack (not shown).

Figure 4:
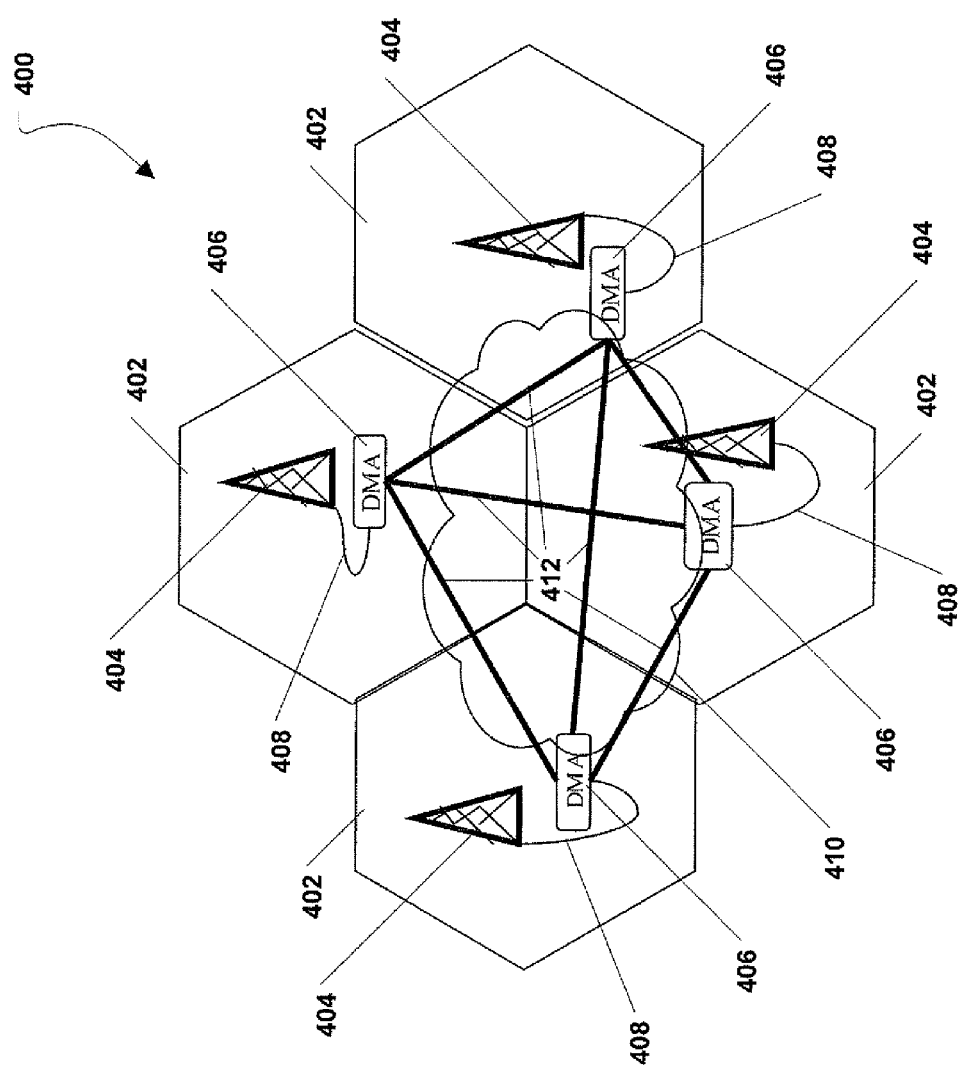
FIG. 4 is a diagram of a distributed and associative communication system.

In a particular embodiment, the length 304 of the housing 302 is approximately 76.2 centimeters. Further, in a particular embodiment, the width 306 of the housing 302 is approximately 48.2 centimeters. Additionally, in a particular embodiment, the height 308 of the housing 302 is approximately 4.3 centimeters. Accordingly, the DMA server 300 has a total volume of approximately 15,756.5 centimeters cubed and a footprint area of approximately 3,672.9 centimeters squared. Further, in a particular embodiment, the DMA server 300 weighs approximately 17.7 kilograms (kg). Also, in a particular embodiment, the DMA server 300 is stackable in order to support various capacity requirements. As such, in a particular embodiment, the DMA server 100 has a total volume that is less than 16,000 centimeters cubed, a footprint area that is less than 4,000 centimeters squared, and a weight that is less than 20.0 kilograms Referring to FIG. 4, a non-limiting, exemplary embodiment of a distributive and associated telecommunications system is illustrated and is generally designated 400. As depicted in FIG. 4, the system 400 includes four cellular coverage sites 402. Each coverage site 402 includes an antenna 404. In one embodiment, the antenna 404 is connected to a transceiver belonging to a base transceiver station (BTS) and the BTS is a 3-sector BTS. FIG. 4 also indicates that a distributed mobile architecture (DMA) server 406 can be connected to each antenna 404. In one embodiment, each DMA server 406 is physically and directly connected to its respective antenna 404, e.g., by a wire or cable 408. Further, in an illustrative embodiment, the DMA servers 406 can be any of the DMA servers shown in FIG. 1, FIG. 2, and FIG. 3.

As illustrated in FIG. 4, each DMA server 406 is interconnected with the other DMA servers 406 via an Internet protocol network 410. As such, there exists a peer-to-peer connection 412 between each DMA server 406 in the system 400. As described in detail below, the DMA servers 406 can handle telephony traffic that is communicated at each antenna 404. For example, the DMA servers 406 can switch and route calls received via each antenna 404. Additionally, the DMA servers 406 can hand-off calls to each other as mobile communication devices move around and between the cellular coverage sites 402. The DMA servers 406 can communicate with each other via the IP network 410 and can further transmit calls to each other via the IP network 410. It should be understood that more than four cellular coverage sites 402 can be included in the system and that the inclusion of only four cellular coverage sites 402 in FIG. 4 is merely for clarity and explanation purposes.

Within the distributed and associative telecommunications system 400 the controlling logic can be distributed and de-centralized. Moreover, the wireless coverage provided by the disclosed system 400 is self-healing and redundant. In other words, due to the interconnectivity via the IP network 410, if one or more of the DMA servers 406 loses powers, fails, or is otherwise inoperable, telephony traffic handled by the inoperable DMA server 406 can re-routed to one of the remaining operable DMA servers 406. Additionally, user data stored in a database, e.g., a home locator resource (HLR) or a visitor locator resource (VLR), can be distributed equally and fully among all of the DMA servers 406. It can also be appreciated that new cellular coverage sites can be easily added to the system 400 as the demand for users increases. Specifically, a DMA server can be deployed as described below, connected to an antenna, connected to the IP network, and activated to provided cellular coverage in a new area.

Figure 5:
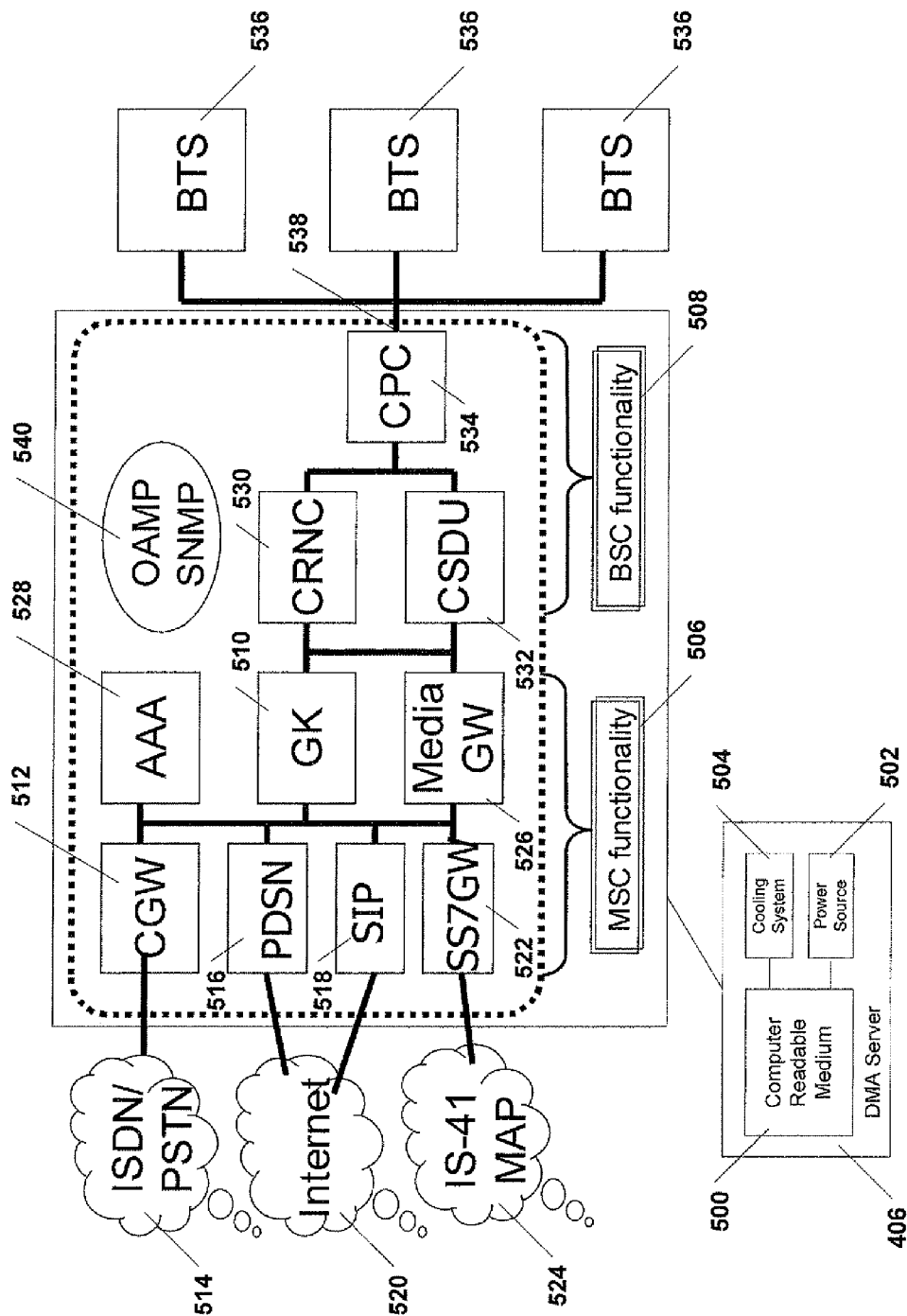
FIG. 5 is a block diagram of a distributed management architecture server.

FIG. 5 shows an exemplary, non-limiting, detailed embodiment of a DMA server, e.g., one of the DMA servers 406 described in conjunction with FIG. 4. Further, any of the DMA servers 100, 200, 300 shown in FIG. 1, FIG. 2, and FIG. 3 can include the components depicted in FIG. 5 and described herein.

In a particular embodiment, the DMA server 406 is essentially a processor, or computer, having a housing and a computer readable medium 500 that is disposed therein. A power supply 502 can also be disposed within the housing of the DMA server 406 in order to provide power to the DMA server 406. The power supply 502 can be a rechargeable battery disposed within the DMA server 406 or it can be external to the DMA server 406, i.e., a standard power outlet. Moreover, a cooling system 504, e.g., a fan with a thermostat, can be within the DMA server 406 in order to keep the DMA server 406 from overheating. In an alternative embodiment, the DMA server 406 can be a single board processor that does not require a fan.

As depicted in FIG. 5, the DMA server 406 can include a mobile switching center (MSC) module 506 and a base station controller (BSC) module 508 embedded within the computer readable medium 500. In an exemplary, non-limiting embodiment, the MSC module 506 can include a gatekeeper (GK) 510 that is connected to several gateways. For example, a circuit gateway (CGW) 512 can be connected to the GK 510 and can provide connectivity to an integrated services digital network/public switched telephone network (ISDN/PSTN) interface 514. The CGW 512 can provide a circuit switched to packet data conversion. In an exemplary, non-limiting embodiment, the PSTN portion of the ISDN/PSTN interface 514 can be an inter-office interface that uses the Bellcore industry standard ISDN user part (ISUP) signaling on a signaling system seven (SS7) link set. Moreover, the voice trunks on this interface can be timeslots on a T1 connection. Inbound and outbound voice calls can be supported on the ISDN portion of the ISDN/PSTN interface 514.

As further illustrated in FIG. 5, a packet data server node (PDSN) gateway 516 for CDMA, or a Gateway GPRS Support Node (GGSN) for Global System for Mobile Communication (GSM), and a Session Initiation Protocol (SIP) gateway 518 can also be connected to the GK 510. The PDSN gateway 516 and the SIP gateway 518 can provide connectivity to an Internet protocol (IP) interface 520. Further, the PDSN gateway 516 or a GGSN can establish a reverse tunnel with the PDSN or GGSN gateway 516 using generic routing encapsulation (GRE). Moreover, the PDSN gateway 516, or GGSN, can implement the Pseudo Random Function (PRF)/Foreign Agent (FA) functionality of the DMA server 406 which supports mobile IP functions.

FIG. 5 further shows an SS7 gateway 522 that provides connectivity to an ANSI-41 and GSM Mobile Application Part (MAP) interface 524. In a particular embodiment, the ANSI-41 interface can be an SS7 TCAP/SCCP interface on the same SS7 link set used for ISUP signaling. The same SS7 point code can be used to identify the DMA server 406 in the ANSI-41 network. The ANSI-41 interface can be used for roamer registration. Further, in an exemplary, non-limiting embodiment, the GSM MAP interface can be an SS7 TCAP/SCCP interface on the same SS7 link set used for ISUP signaling. It can be appreciated that there are different protocols of MAP from MAP/B to MAP/I, but in the illustrative embodiment, the different MAP/x protocols are not stacked—they are used independently.

As depicted in FIG. 5, a media gateway 526 can also be coupled to the GK 510. In an exemplary, non-limiting embodiment, the media gateway 526 can include cellular transcoders, one or more intranet gateways, conferencing bridges, and group calling functionality. Further, an authentication, authorization, and accounting (AAA) module 528 can be coupled to the GK 510. In an exemplary, non-limiting embodiment, there are three levels of authentication management. The highest level is for administration, the mid-level is for operations, and the lowest level is for normal users. The functions of the AAA module 528 can be included in the user level.

In an exemplary, non-limiting embodiment, the GK 510 can act as an AAA server and a feather server to support advanced supplementary service, short message service, etc. Moreover, the GK 510 can act as a call manager and can support ISUP and PSTN function calls. Additionally, the GK 510 can act as a signal gateway, e.g., IP to SS7 inter-working, ISUP, GSM MAP or ANSI-41 to PSTN and ANSI-42/GSM. The GK 510 can also function as a data call server.

As illustrated in FIG. 5, the BSC module 508 includes a cellular radio network controller (CRNC) 530 and a cellular selection/distribution unit (CSDU) 532 that are connected to a call protocol controller (CPC) 534. In turn, the CPC 534 can be connected to a plurality of base transceiver stations (BTSs) 536. Specifically, the DMA server 406 includes a BTS interface 538 at the CPC 534 that can be physically and directly connected to the BTSs 536. The CRNC 530 can provide cellular radio resource management and cellular call control. The CSDU 532 can provide Fundamental Channel (FCH) soft handoff and distribution, Link Access Control (LAC) processing for inband signaling, multiplexer (MUX) functions, and centralized power control. Further, the CPC 534 can convert a T1 or E1 message or ATM interface to a data packet message. In a particular embodiment, each BTS 536 supports signals and traffic up to the front point of the CPC 534, e.g., up to the BITS interface 538. Further, in a particular embodiment, the CRNC 530, the CPC 534, the CSDU 532 and the OAMP 540 can perform one or more of the functions of legacy Base Station Controllers (BSC).

In an exemplary, non-limiting embodiment, the BTS interface 538 can be an IS-95A OR IS-2000 interface over E1 or ATM, or the BTS interface 538 can be a GSM BTS interface using MAP or customized application for mobile network enhanced logic (CAMEL). In an illustrative embodiment the CPC 534 can be connected to one or more BTSs 536. FIG. 5 further shows that the BSC module 508 includes an operations, administration, maintenance, and provisioning (OAMP) module 540. In an exemplary, non-limiting embodiment, the OAMP module 540 can use simple network management protocol (SNMP) for operations interfaces. Further, the OAMP module 540 can include a JAVA user interface. The OAMP module 540 can also include a software agent that is assigned to each component within the DMA server 406. The agents independently monitor their respective components. Moreover, each agent can provision its respective component.

Figure 6:
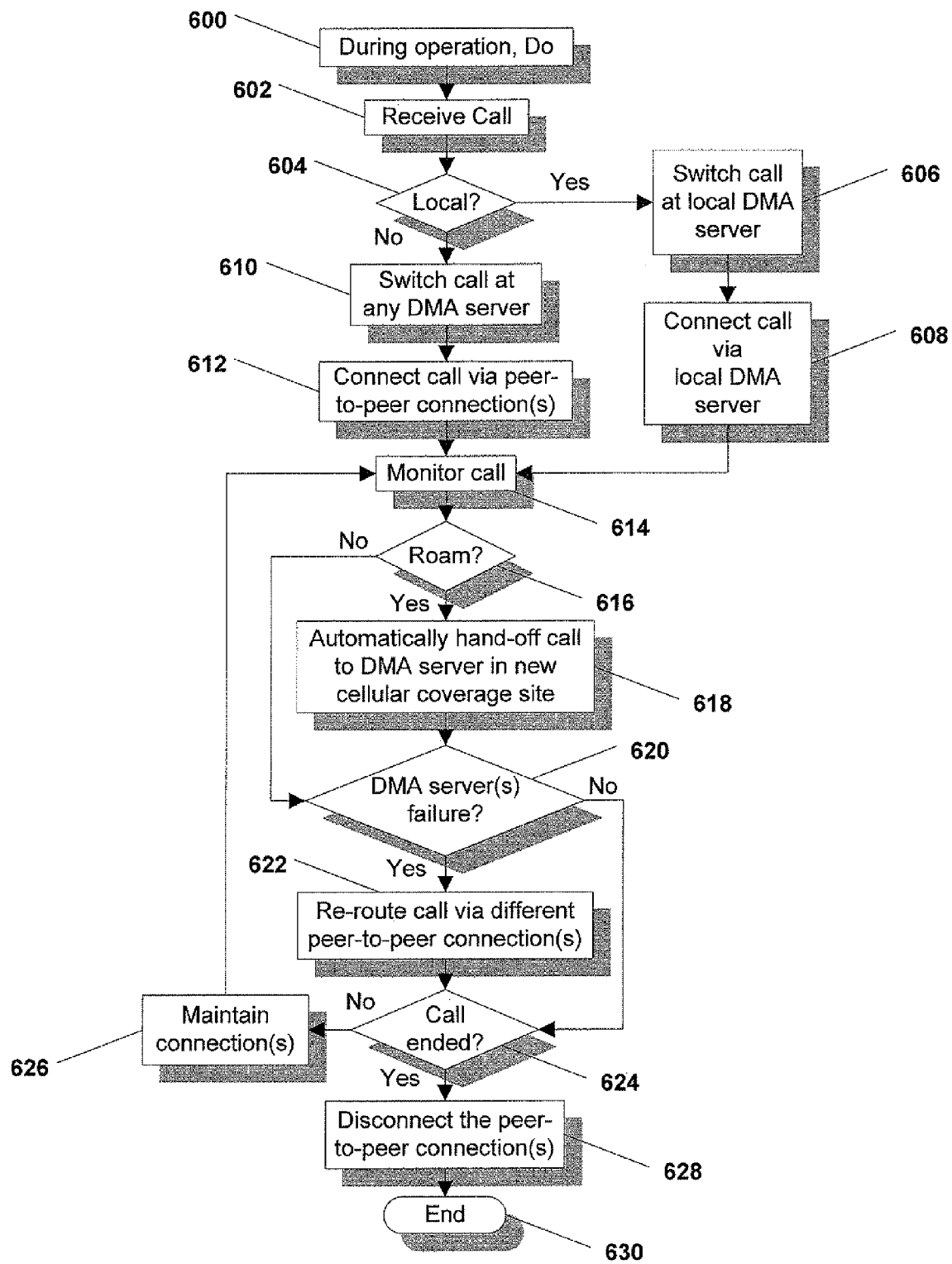
FIG. 6 is a flow chart to illustrate operating logic of a distributed management architecture server.

Referring to FIG. 6, an exemplary, non-limiting embodiment of a flow chart is provided to illustrate operating logic of a DMA server 406 (FIG. 4). The operating logic commences at block 600 with a function loop wherein during operation, the succeeding steps are performed. At step 602, a call is received, e.g., at an antenna 404 (FIG. 4) in communication with a DMA server 406 (FIG. 4). Next, at decision step 604 it is determined whether the call is local, i.e., it is determined whether the call is between two mobile communication devices within the same cellular coverage site. If the call is local, the logic moves to block 606, and the call is switched at the local DMA server, i.e., the DMA server within the cellular coverage site in which the call is received. Then, at block 608, the call is connected from the first mobile communication device that initiated the call to a second mobile communication device via the local DMA server. Returning to decision step 604, if the call is not local, the logic proceeds to block 610 and the call is switched at the DMA server connected to the antenna 404 at which the call was received. Thereafter, at block 612, the call is connected from the first mobile communication device that initiated the call to a second mobile communication device via a peer-to-peer connection between a first DMA server and a second DMA server.

After the call is connected, either at block 608 or block 612, the logic continues to block 614 where the call is monitored. For example, the location of the first mobile communication device that initiated the call can be monitored, the location of the second mobile communication device that received the call can be monitored, the DMA server that is handling the call can be monitored, other DMA servers through which the call is connected can be monitored, and the connections (such as the peer-to-peer IP network connection) through which the call is transmitted can be monitored. Proceeding to decision step 616, it is determined if the first mobile communication device or the second mobile communication device involved in the call is roaming, i.e., moving between cellular coverage sites provided by individual antennas. If so, the logic moves to block 618 where the call at the roaming mobile communication device is automatically handed off to a new DMA server and associated antenna at a new cellular coverage site. If none of the mobile communication devices involved in the call is roaming, the logic moves to decision step 620.

At decision step 620, it is determined whether any DMA server has failed. If so, the call is re-routed around the failed DMA server by establishing one or more different peer-to-peer connections between one or more different DMA servers that are still operable. Thereafter, the logic moves to decision step 624. Decision step 624 can also be reached if it is determined that no DMA servers have failed at decision step 620. At decision step 624, it is determined whether the call has ended. If not, the logic moves to block 626 and the connection or connections through which the call has been established are maintained. Otherwise, if the call has ended, the logic moves to block 628 and the peer-to-peer connection, or connections, through which the call was established are terminated, and the logic ends, at state 630.

Figure 7:
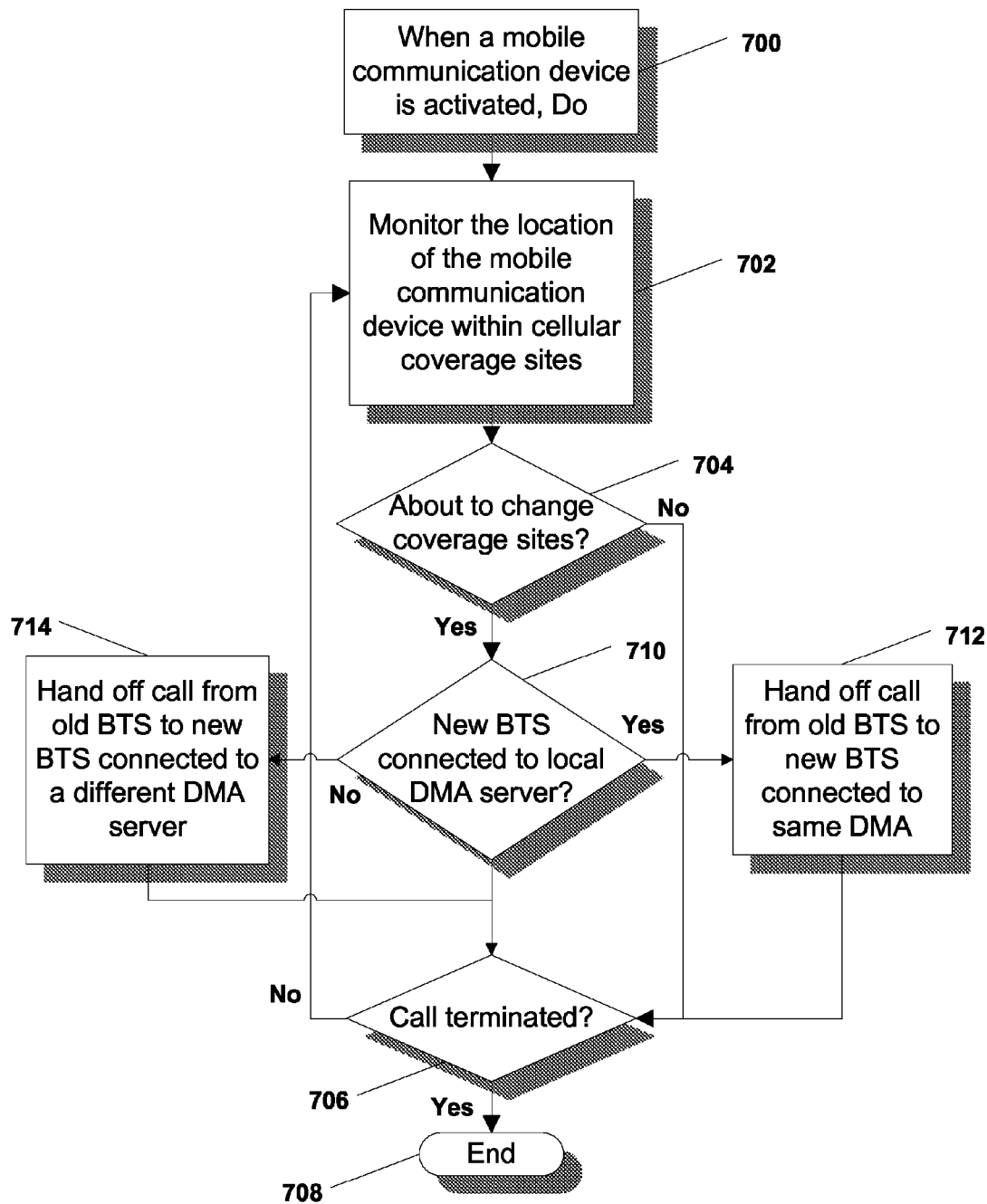
FIG. 7 is a flow chart to illustrate call hand-off logic of a distributed management architecture server.

FIG. 7 depicts a flow chart to illustrate call hand-off logic that can be performed by a DMA server 406 (FIG. 4) in order to hand off calls, or user service connections, between a first BTS and a second BTS as a mobile communication device moves between cellular coverage zones. The logic commences at block 700 with a loop wherein when a mobile communication device is activated, the following steps are performed. At block 702, the location of a mobile communication device is monitored at a local DMA server. Continuing to decision step 704, it is determined if the mobile communication device is about to move from a first cellular coverage site provided by a first BTS to a second cellular coverage site provided by a second BTS. If not, the logic moves to decision step 706 where it is determined whether the call has terminated. If the call terminates, the logic ends at state 708. On the other hand, if the call does not terminate, the logic returns to block 702 and continues as described above.

Returning to decision step 704, if the user is about to move from a first cellular coverage site provided by a first BTS to a second cellular coverage site by a second BTS, the logic proceeds to decision step 710. At decision step 710, it is determined whether the second BTS is connected locally, i.e., to the same DMA server as the first BTS. If so, the logic moves to block 712 and the DMA server hands off the call, e.g., as a soft hand off, or the user service connection, from a first BTS connected to the DMA server to a second BTS connected to the same DMA server. Conversely, if the second BTS is not local, the logic continues to block 714 where the DMA server hands off the call from a first BTS connected to the DMA server to a second BTS connected to a second DMA server. From block 712 or block 714, the logic proceeds to decision step 706 and continues as described above.

Figure 8:
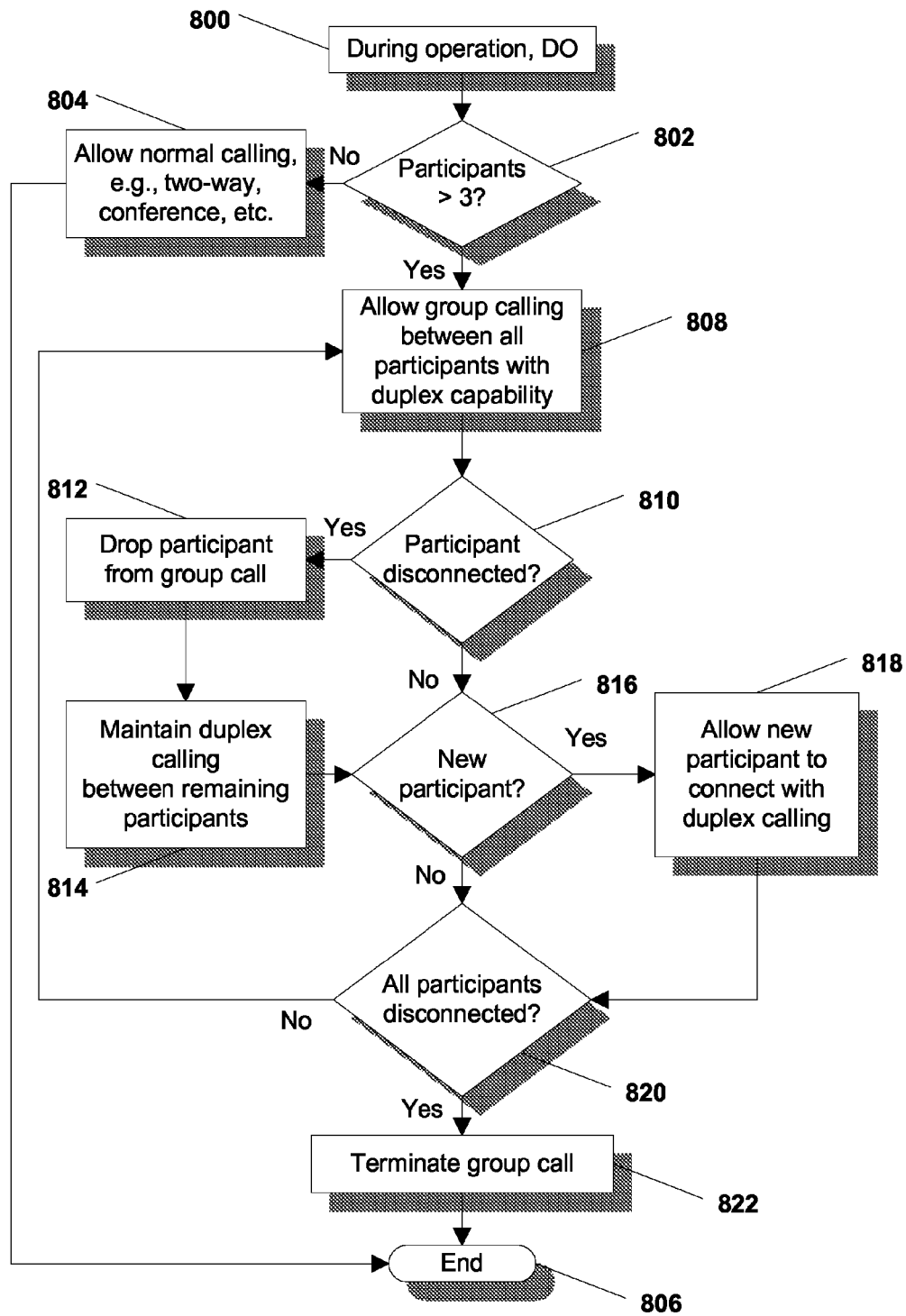
FIG. 8 is a flow chart to illustrate group call logic of a distributed management architecture server.

FIG. 8 portrays an exemplary, non-limiting embodiment of a method to illustrate group call logic that can be executed at a DMA 406 (FIG. 4) to provide a group call between several mobile communication devices and PSTN/ISDN users. At block 800, a loop is entered wherein during operation, the following steps are performed. At decision step 802, it is determined whether greater than three (3) callers are participating in a telephone call handled via one or more DMA servers 406 (FIG. 4). If not, the logic continues to block 804 and normal calling, e.g., two-way calling, three-party conference calling, etc., is allowed. The logic then ends at state 806.

At decision step 802, if greater than three (3) callers are participating in a telephone call that is handled via one or more DMA servers 406 (FIG. 4), the logic moves to block 808 and group calling is allowed between all participants with full duplex capability. Next, at decision step 810, it is determined whether one or more participants have disconnected. If so, at decision block 812, the disconnected participant or participants are dropped from the group call. At block 814, full duplex calling is maintained between the remaining group call participants. Returning to decision step 810, if no participants have disconnected, the logic proceeds to decision step 816 where it is determined whether a new participant has connected to the group call. Decision step 816 is also reached from block 814, above.

At decision step 816, if a new participant enters the group call, the new participant is allowed to connect to the group call and may communicate with any one or more of the other participants with full duplex capability. The logic then moves to decision step 820. Decision step 820 is also reached from decision step 816 if no new participants have entered the group call. At decision step 820, it is determined whether all participants have disconnected from the group call. If not, the logic returns to block 808 and continues as described above. On the other hand, if all participants have disconnected from the group call, the logic moves to block 822 where the group call is terminated and then ends at state 806.

Figure 9:
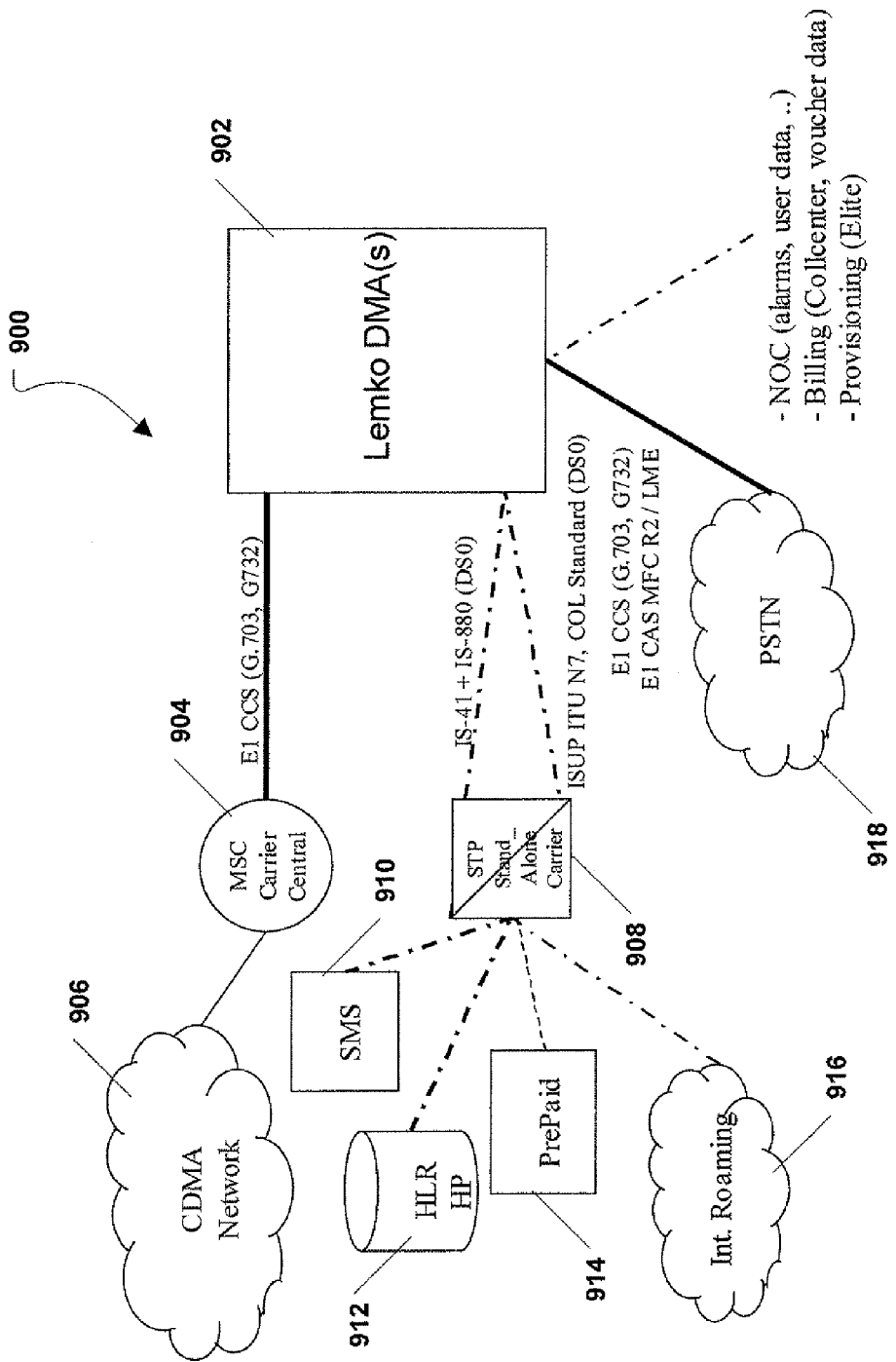
FIG. 9 is a diagram of an exemplary communication system in which a distributed management architecture server can be incorporated.

Referring now to FIG. 9, an exemplary, non-limiting embodiment of a telecommunications system is shown and is generally designated 900. As shown, the system includes one or more DMA servers 902 that are connected to a wireless carrier's central MSC 904. The DMA server(s) 902 can be connected to the MSC 904 via an E1 CCS (G.703, G732) connection, or any other applicable connection. The MSC 904, in turn, is connected to a code division multiple access (CDMA) network 906. FIG. 9 further shows that the DMA server(s) 902 can be connected to a switching transfer point (STP) 908 of a stand-alone carrier. As shown, the DMA server 902 can be connected to the STP 908 via an IS-41+IS-880 (DS0) connection, or an ISUP ITU N7 connection.

As further depicted in FIG. 9, the STP 908 can be connected to a short messaging service (SMS) server 910 in order to provide text-messaging capabilities for the mobile communication devices using the system 900 shown in FIG. 9. Additionally, the STP 908 can be connected to a home location register (HLR) 912, a pre-paid wireless server 914 and an international roaming network 916 in order to provide pre-paid services and roaming between multiple countries. FIG. 9 shows that the DMA server(s) 902 can be connected to the PTSN 918 via an E1 CCS (G.703, G732) connection, or any other appropriate connection.

Figure 10:
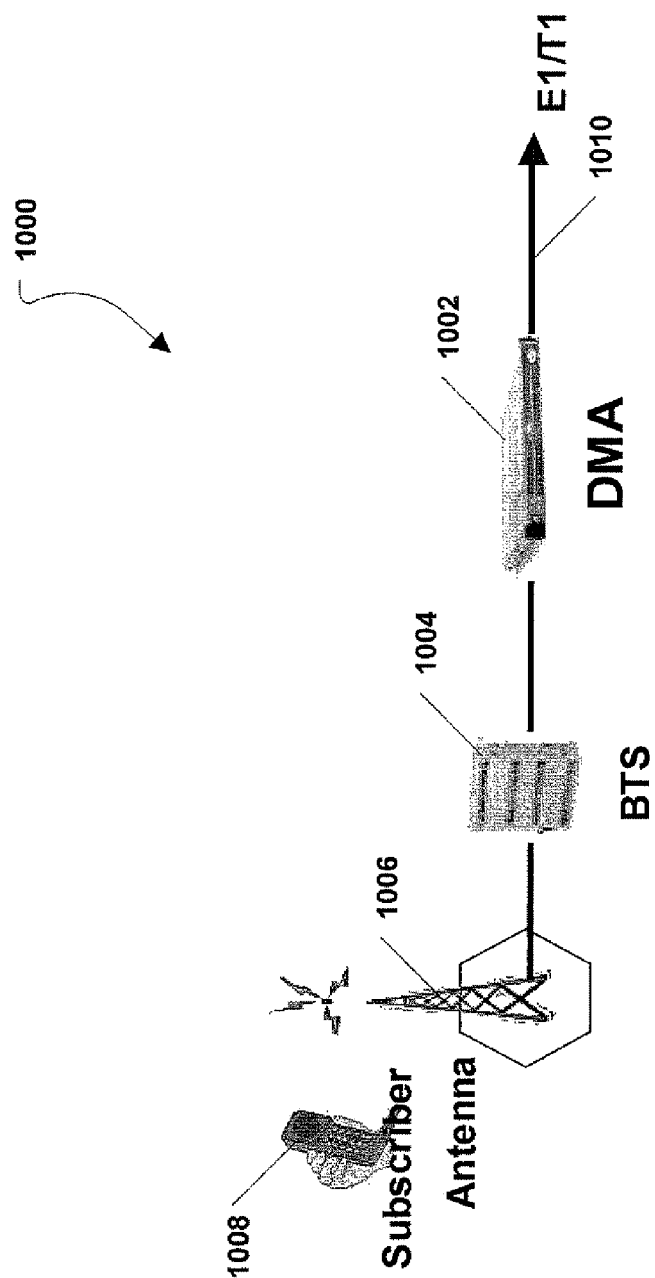
FIG. 10 is a diagram of a wireless local loop communication system in which a distributed management architecture server can be incorporated.

Referring to FIG. 10, a wireless local loop (WLL) system is portrayed and is generally designated 1000. As illustrated in FIG. 10, the system 1000 includes a DMA server 1002 that is connected to a BTS 1004. The BTS 1004, in turn, is connected to an antenna 1006. The antenna 1006 provides cellular coverage for one or more subscribers 1008 within transmission distance of the antenna 1006. FIG. 10 indicates that the system 1000 can further include a data network connection 1010 from the DMA server 1002. The data network connection 1010 can connect the DMA server 1002 to the PSTN via an ISUP/ISDN signaling connection on an SS7 link set or a T1/E1 wireless connection. Further, the data network connection 1010 can be an IEEE 802.11 connection between the DMA server 1002 depicted in FIG. 10 and other DMA servers not shown. The DMA server 1002 can beneficially utilize existing infrastructure used for cellular and SMS data services.

Figure 11:
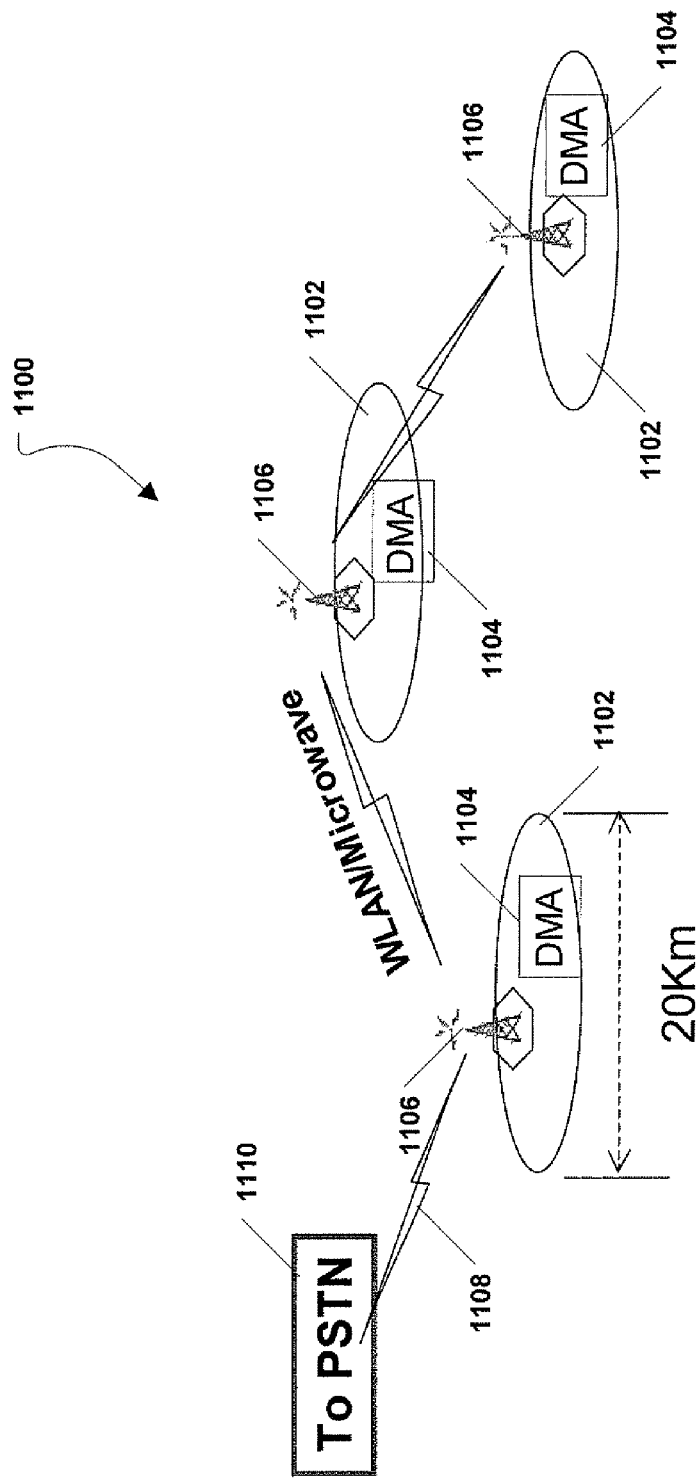
FIG. 11 is a diagram of plural wireless local loop communication systems connected to the public switched telephone network via a single back-haul connection.

FIG. 11 shows a multi-WLL system, generally designated 1100. As shown, the system 1100 includes a plurality of WLLs 1102. Each WLL 1102 can include a DMA server 1104 and an antenna 1106 connected thereto to provide a cellular coverage site around the antenna 1106. As illustrated in FIG. 11, the WLLs 1102 can be interconnected via a wireless local area network (WLAN), or a wide area network, such as a microwave connection. Moreover, a DMA server 1104 within one of the WLLs 1102 can provide a back-haul connection 1108 to the PST 1110. This type of deployment scenario can greatly reduce the costs associated with a wireless system. Since the DMA servers 1104 are connected to each other via the WLAN or microwave connections, the relatively expensive inter-site back-haul component is removed. Further, using the hand-off logic, the DMA servers 1104 can enable roaming between the WLLs 1102 and can further provide roaming to an external wireless or other network.

Figure 12:
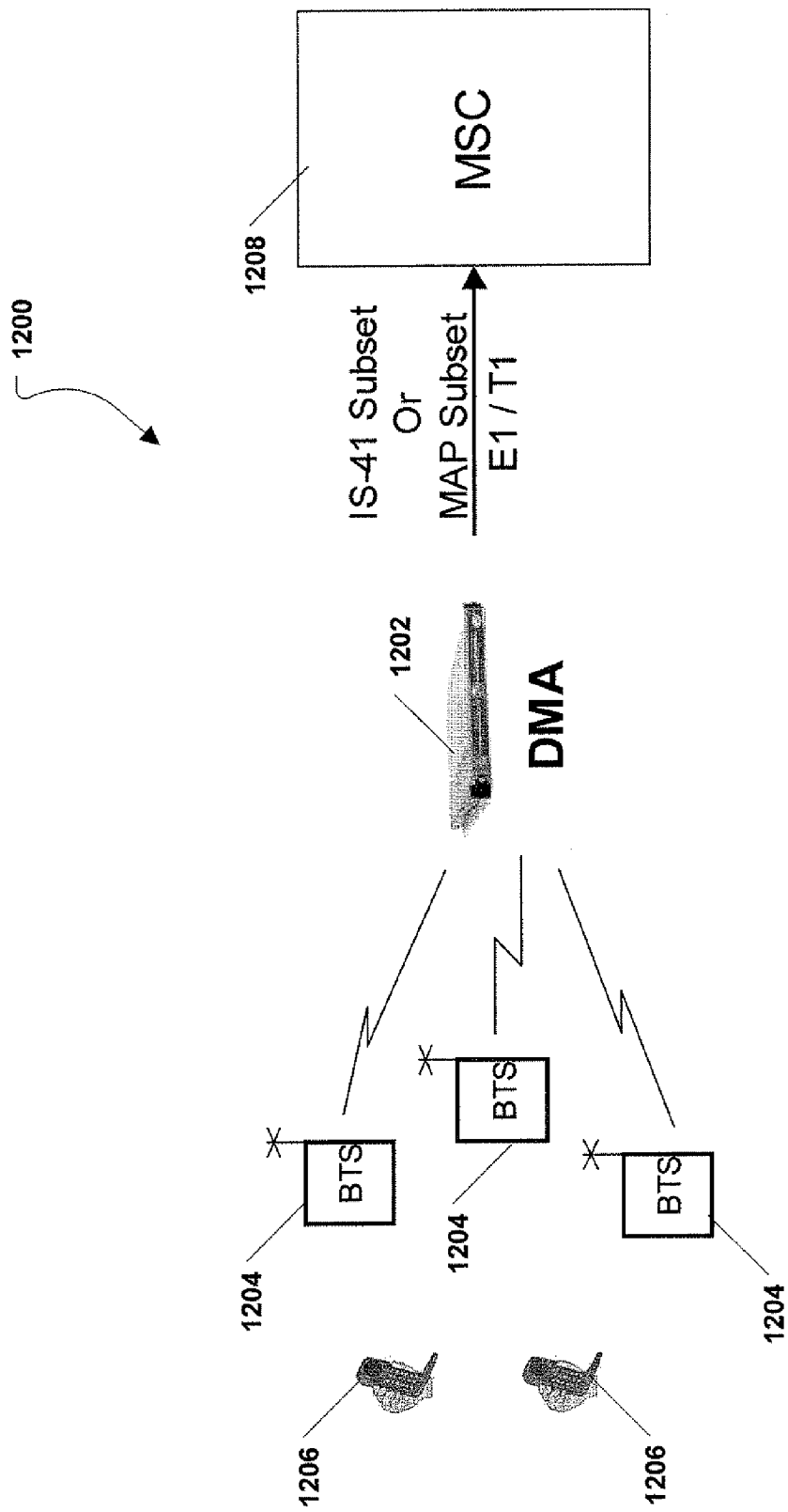
FIG. 12 is a diagram of a communication system in which a distributed management architecture server can be deployed to extend an existing cellular network.

Referring to FIG. 12, a telecommunications system is depicted and is designated 1200. As illustrated in FIG. 12, the system 1200 includes a DMA server 1202 that can be connected to a plurality of BTSs 1204. Each BTS 1204 can provide cellular coverage for one or more mobile communication devices 1206, e.g., one or more mobile handsets configured to communicate via the DMA server 1202. FIG. 12 further shows that the DMA server 1202 can be connected to an MSC 1208, such as an MSC of an existing cellular system. The DMA server 1202 can be connected to the MSC via an IS-41 subset or a MAP subset over a wireless E1/T1 connection. With this implementation, the DMA server 1202 can extend an existing cellular network when connected to an existing cellular system MSC 1208.

Figure 13:
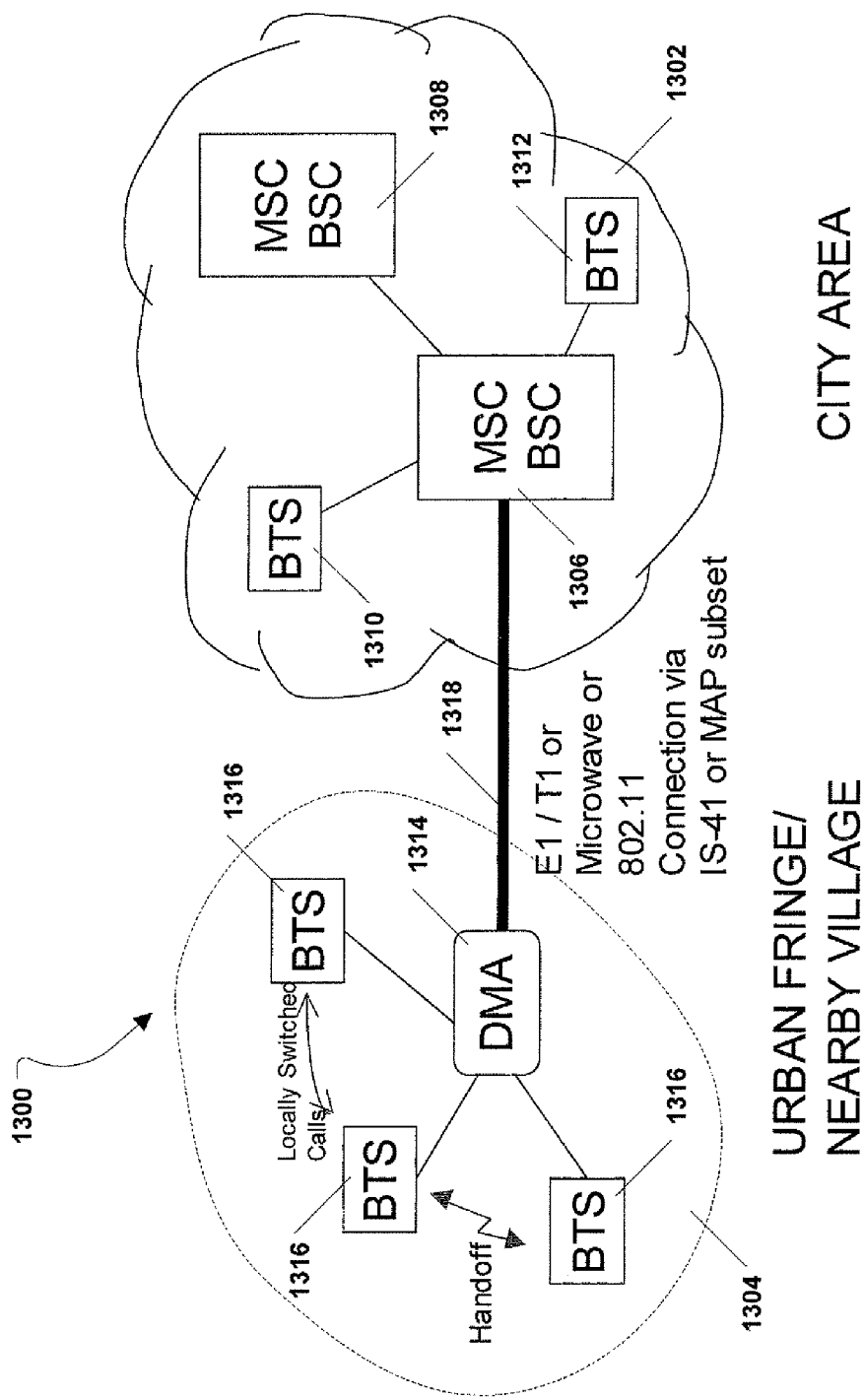
FIG. 13 is a diagram of a communication system in which a distributed management architecture server can be deployed to cover urban fringe around an existing network.

FIG. 13 shows an additional telecommunications system, generally designated 1300. As shown, the system 1300 includes a city area coverage site 1302 and an urban fringe/nearby village coverage site 1304. In an exemplary, non-limiting embodiment, the city area coverage site 1302 includes a first MSC/BSC center 1306 connected to a second MSC/BSC center 1308. Also, a first representative BTS 1310 and a second representative BTS 1312 are connected to the first MSC/BSC center 1306. The particular deployment of equipment is configured to provide adequate cellular coverage for mobile communication devices within the city area coverage site 1302.

As illustrated in FIG. 13, the urban fringe/nearby village coverage site 1304 includes a DMA server 1314 having a plurality of BTSs 1316 connected thereto. The DMA server 1314 can provide hand-off of calls between the BTSs 1316 and can switch calls made between the BTSs 1316 locally. However, the DMA server 1314 within the urban fringe/nearby village coverage site 1304 can also connect telephony traffic to the first MSC/BSC center 1306 within the city area coverage site 1302 via a data network connection 1318. In one embodiment, the data network connection can be an E1 connection, a T1 connection, a microwave connection, or an 802.11 connection established via an IS-41 subset or MAP subset. The deployment of a DMA server 1314 in a location such as that described above, i.e., in urban fringe or in a nearby village, and the connection of the DMA server 1314 to an MSC/BSC center 1306 in a city area, can provide service to potential wireless customers that typically would not receive cellular coverage from the city area cellular coverage site 1302. Thus, new subscribers receive access to wireless communication service and can her communicate with wireless customers within the city area cellular coverage site 1302.

Figure 14:
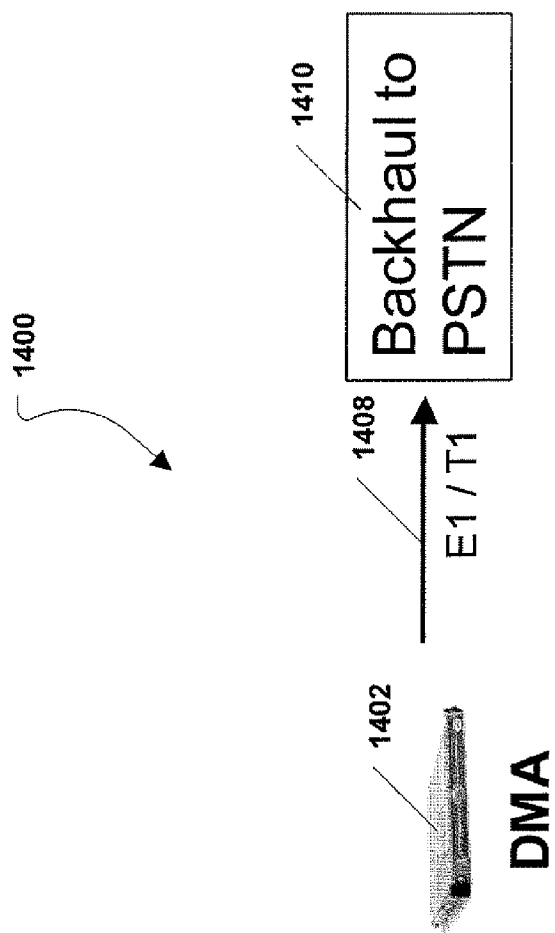
FIG. 14 is a diagram of a communication system in which a single distributed management architecture server can be connected to plural base transceiver stations and can provide a single backhaul to the public switched telephone network.
Figure 14:
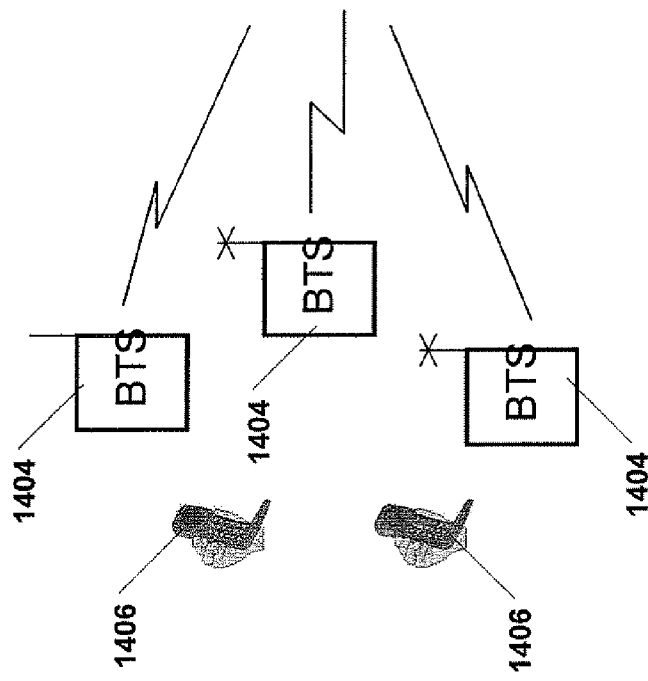

Referring now to FIG. 14, another telecommunications system is depicted and is designated 1400. As illustrated in FIG. 14, the system 1400 includes a DMA server 1402 that can be connected to a plurality of BTSs 1404. Each BTS 1404 can provide cellular coverage for one or more mobile communication devices 1406. FIG. 14 further shows that the DMA server 1402 can include a data network connection 1408 that provides a back-haul connection to the PSTN 1410. In one embodiment, the data network connection can be an E1 connection, a T1 connection, a cable connection, a microwave connection, or a satellite connection. Moreover, the system 1400 depicted in FIG. 14 can be deployed using CDMA IS-95, CDMA 1X, GSM/GPRS, W-CDMA, or other industry standard technologies.

Using a single back-haul connection greatly minimizes costs associated with the wireless communication network. Further, the system 1400 shown in FIG. 14 can be deployed relatively rapidly and can be maintained remotely. Additionally, with the inclusion of the OAMP module 540 (FIG. 5) and the AAA module 528 (FIG. 5), subscriber accounts can be managed locally and billing can be performed locally, i.e., within the DMA server 1402. Moreover, as the number of subscribers increase, the size of the system can be increased modularly, e.g., by adding DMA servers, corresponding BTSs, and the appropriate connections.

Figure 15:
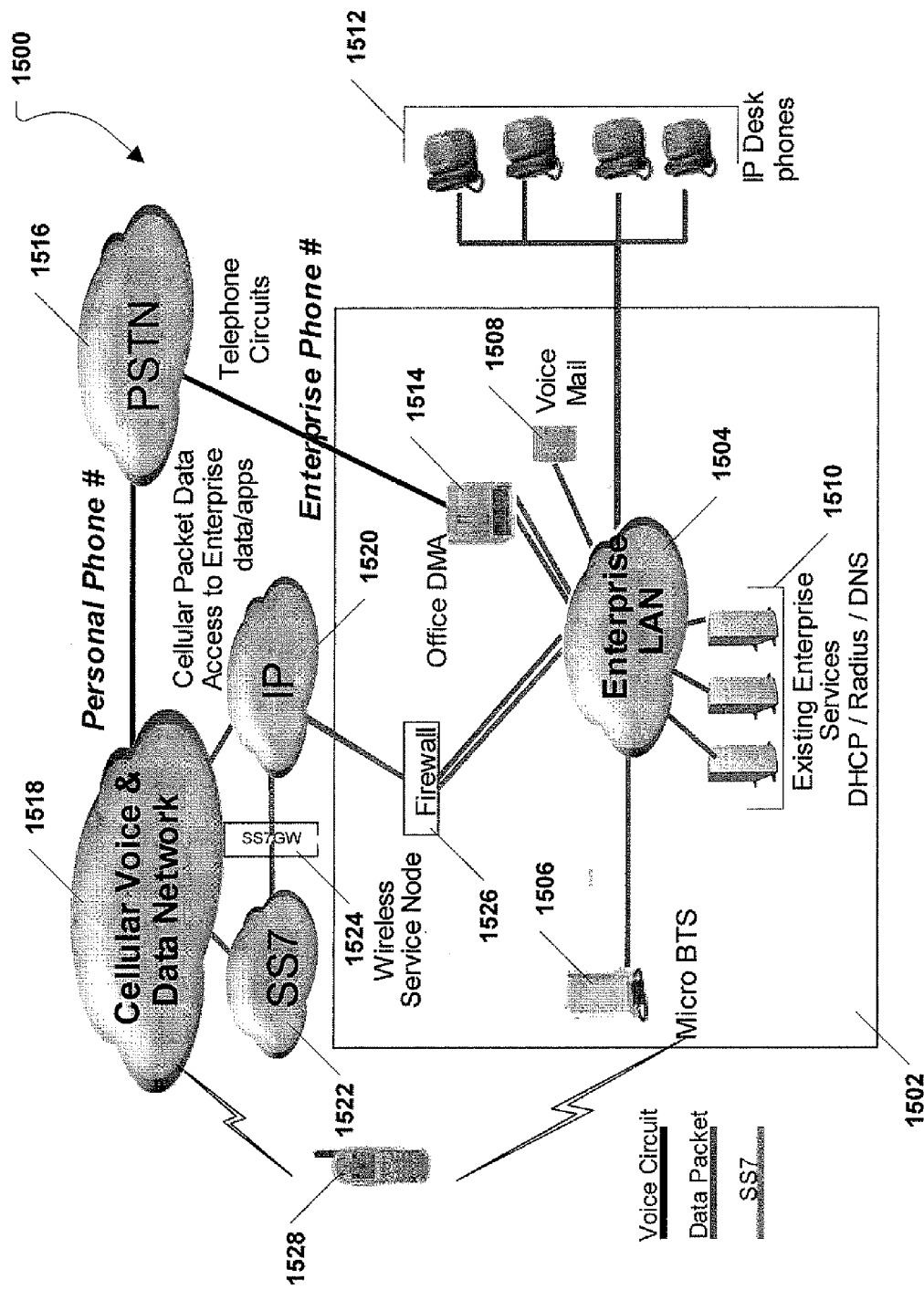
FIG. 15 is a diagram of an in-building communication system in which a distributed management architecture server can be deployed.

FIG. 15 illustrates an in-building telecommunications network that is generally designated 1500. FIG. 15 depicts a structure 1502, e.g., an office building, a commercial building, a house, etc. An enterprise local area network (LAN) 1504 is installed within the building 1502. A micro-BTS 1506 is connected to the enterprise LAN 1504. Moreover, a voice mail server 1508 and plural enterprise services servers 1510 are connected to the enterprise LAN 1504. In an exemplary, non-limiting embodiment, the enterprise services servers 1510 can include a dynamic host configuration protocol (DHCP) server, a radius server, a domain name server (DNS), etc. As depicted in FIG. 15, a plurality of phones 1512, e.g., IP desk phones, can be connected to the enterprise LAN 1504.

FIG. 15 further indicates that an office DMA server 1514 can be connected to the enterprise LAN 1504. The office DMA server 1514 can also be connected to the PSTN 1516, which, in turn, can be connected to a cellular voice and data network 1518. The enterprise LAN 1504 can also be connected to the cellular voice and data network 1518 via an Internet protocol (IP) network 1520. A signaling system seven (SS7) network 1522 can be connected to the cellular voice and data network 1518 and the IP network 1520. FIG. 15 also depicts an SS7 gateway 1524 between the SS7 network 1522 and the IP network 1520 and a firewall 1526 between the enterprise LAN 1504 and the IP network 1520. FIG. 15 shows a wireless communication device 1528 in communication with the cellular voice and data network 1518 and the micro-BTS 1506.

Figure 16:
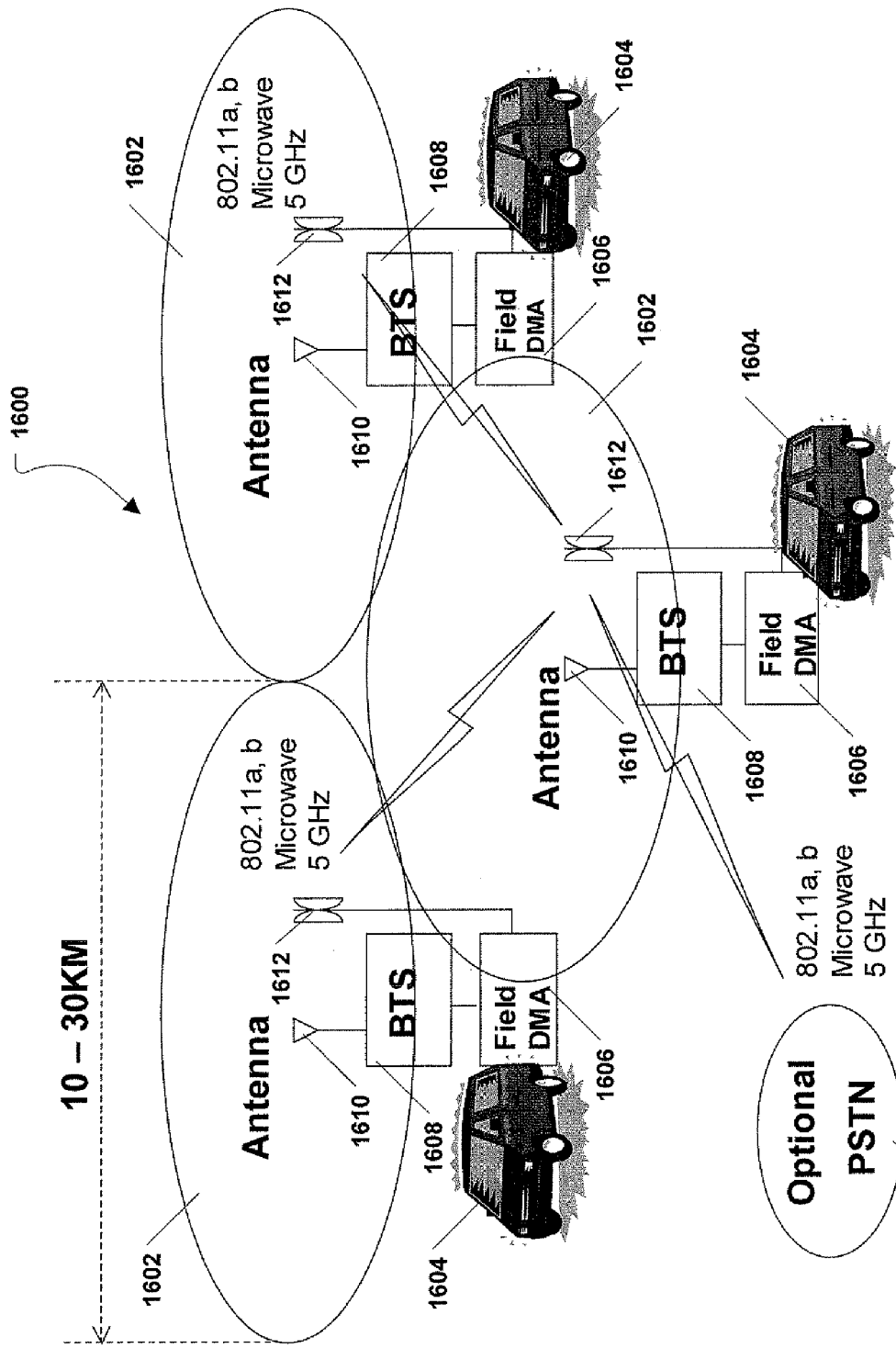
FIG. 16 is a diagram of a mobile in-field communication system in which multiple distributed management architecture servers can be deployed via multiple vehicles.

Referring to FIG. 16, a mobile in-field telecommunications system is depicted and is generally designated 1600. As depicted, the system 1600 includes a plurality of mobile cellular coverage sites 1602. Each mobile cellular coverage site 1602 includes a vehicle 1604 in which a field DMA server 1606 is disposed. Moreover, a BTS 1608 is disposed within each vehicle 1604 and is in direct physical connection with the field DMA server 1606, e.g., by a wire or cable connected there between. The field DMA server 1606 and the BTS 1608 can be removably installed within the vehicle 1604 or permanently affixed therein. FIG. 16 further indicates that each BTS 1608 can include an antenna 1610 that is designed to communicate with mobile communication devices. Also, each field DMA server 1606 includes an antenna 1612. In an exemplary, non-limiting embodiment, the field DMA servers 1606 can communicate wirelessly with each other via the antennae 1612, e.g., via 802.11a, 802.11b, microwaves, or other wireless link.

The mobile cellular coverage sites 1602 can be deployed to provide a temporary web of cellular coverage for a plurality of mobile communication devices, e.g., devices carried by soldiers during a battle. The mobile in-field communications system 1600 can be recalled, moved, and re-deployed as necessary. Further, the system can include a wireless connection, e.g., 802.11a, 802.11b, microwaves, to the PSTN 1614.

Figure 17:
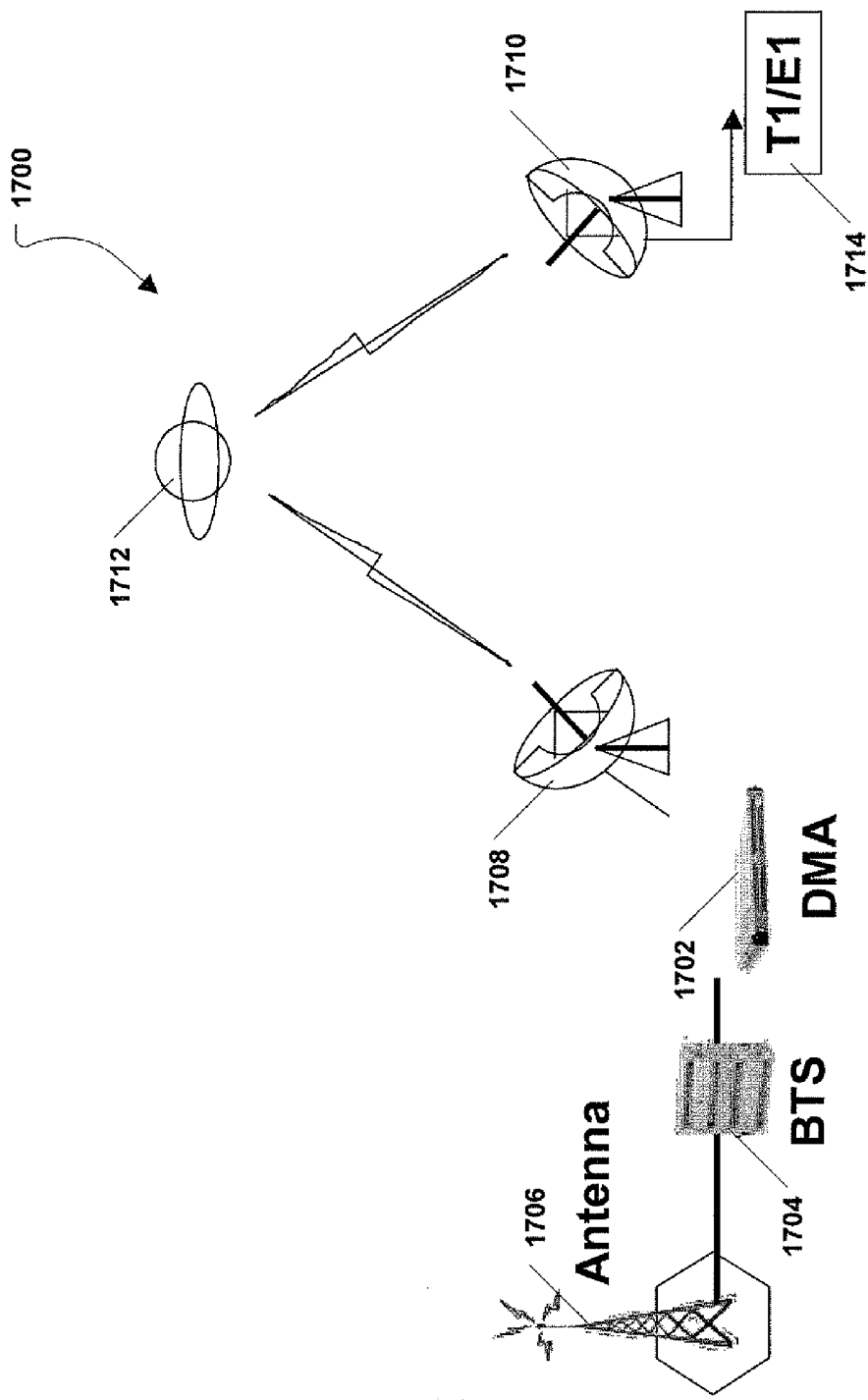
FIG. 17 is a diagram of a communication system in which a distributed management architecture server can utilize a satellite connection as a backhaul connection.

Referring to FIG. 17, still another telecommunications system is illustrated and is generally designated 1700. As depicted in FIG. 17, the system 1700 includes a DMA server 1702 that is connected to a BTS 1704. The BTS 1704, in turn, is connected to an antenna 1706. FIG. 17 further illustrates that a first satellite transceiver 1708 is also connected to the DMA server 1702. The first satellite transceiver 1708 communicates with a second satellite transceiver 1710 via a satellite 1712. Additionally, the second satellite transceiver 1710 includes a data network connection 1714, e.g., a T1 connection, or an E1 connection. The satellite transceivers 1708, 1710 and the satellite 1712 can provide a backhaul connection for the DMA server 1702. Or, the satellite transceivers 1708, 1710 and the satellite 1712 can connect the DMA server 1702 to an additional DMA server (not shown).

Figure 18:
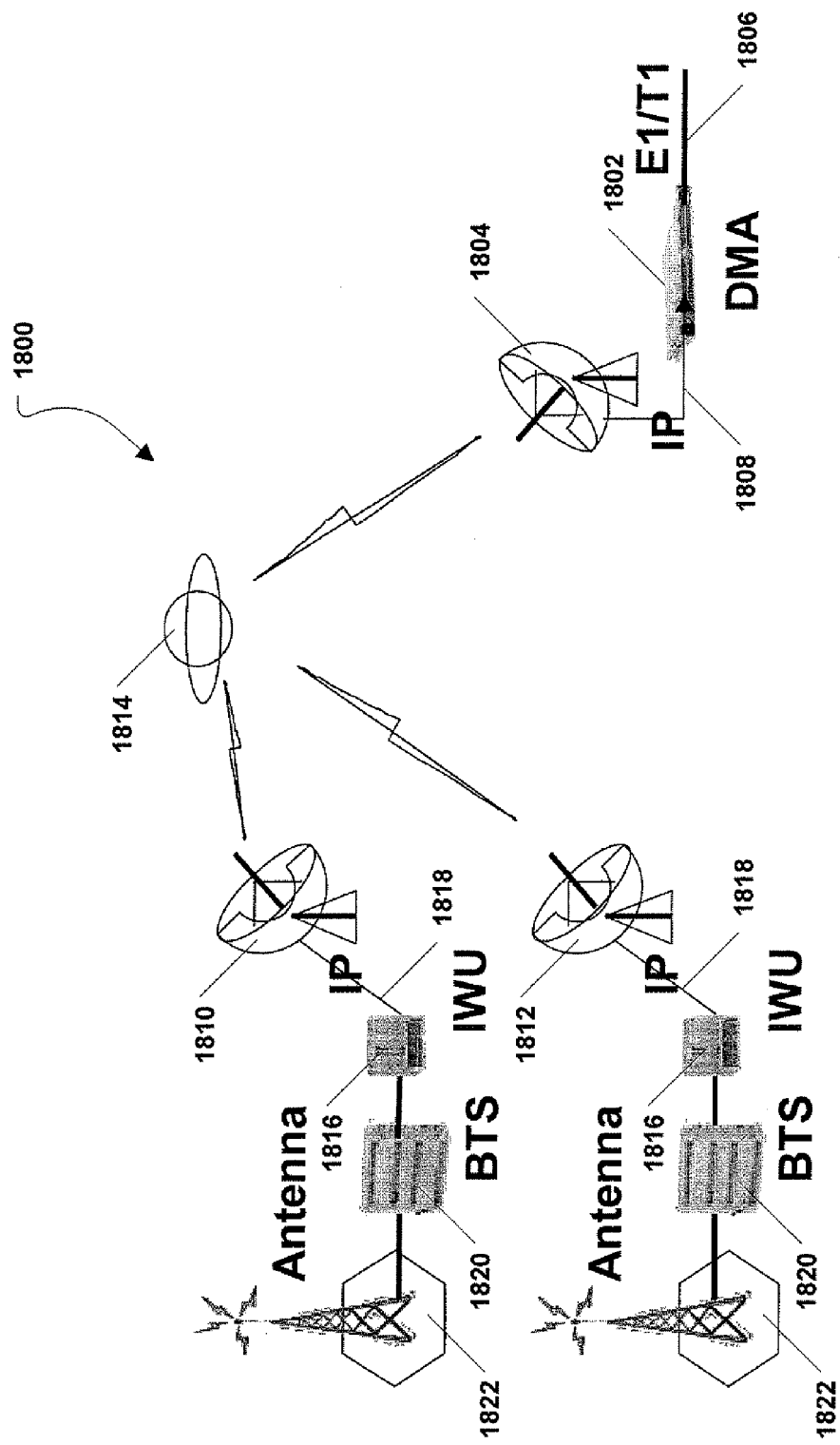
FIG. 18 is a diagram of a communication system in which a distributed management architecture server can receive multiple backhaul signals via multiple satellite signals.

FIG. 18 shows yet another telecommunications system that is generally designated 1800. As illustrated in FIG. 18, the system includes a DMA 1802 that is connected to a first satellite transceiver 1804. Moreover, the DMA 1802 includes a primary network connection 1806, e.g., a T1 connection, or an E1 connection, and a secondary network connection 1808, e.g., an IP connection. FIG. 18 shows that the first satellite transceiver 1804 communicates with a second satellite transceiver 1810 and a third satellite transceiver 1812 via a satellite 1814. Each of the second and third satellite transceivers 1810, 1812 is connected to an interworking unit (IWU) 1816 via a data network connection 1818, e.g., an IP connection. Each IWU 1816 is connected to a BTS 1820, which in turn, is connected to an antenna 1822. The satellite transceivers 1804, 1810, 1812 provide an IP network extension for the DMA server 1802. Moreover, in the deployment illustrated in FIG. 18, the DMA server 1802 can act as a centralized micro-switch for handling calls received at the antennas 1822 and transmitted via the second and third satellite transceivers 1810, 1812.

Figure 19:
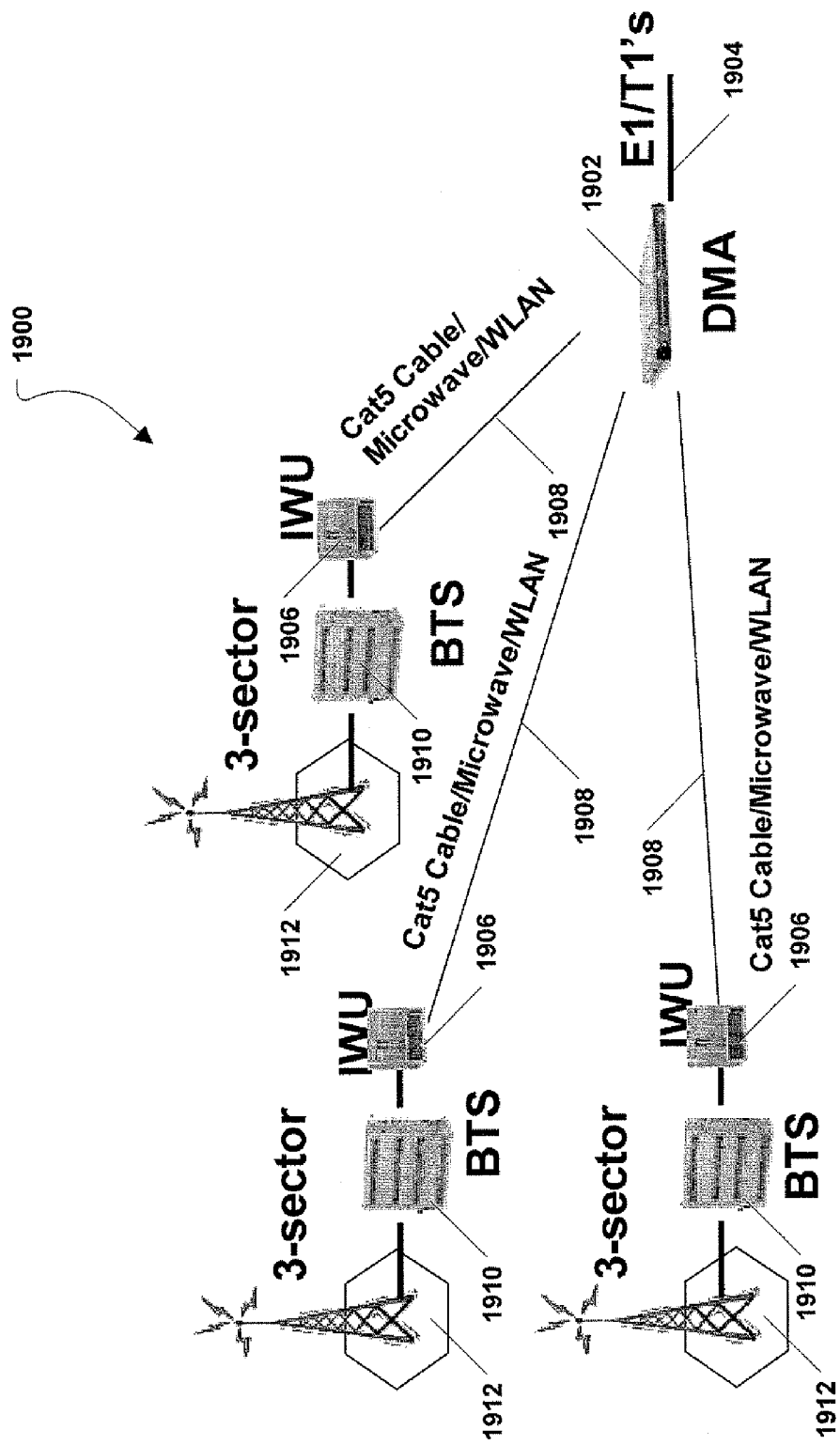
FIG. 19 is a diagram of a communication system in which a single distributed management architecture server can be connected to multiple base transceiver stations.

Referring to FIG. 19, another telecommunications system is depicted and is designated 1900. As shown, the system 1900 includes a DMA server 1902 having a primary network connection 1904. Moreover, the DMA server 1902 can be connected to a plurality of IWUs 1906. In an exemplary, non-limiting embodiment, the DMA server 1902 can be connected to each IWU 1906 via a secondary network connection 1908, such as a category five (Cat 5) cable connection, a microwave connection, or a WLAN connection. Further, each IWU 1906 is connected to a BTS 1910 and each BTS 1910, in turn, is connected to an antenna 1912. Each BTS 1910 can be a 3-sector BTS. In the deployment depicted in FIG. 19, the DMA server 1902 can act as a centralized micro-switch that can be used to handle telephony traffic received at the antennae 1912.

Figure 20:
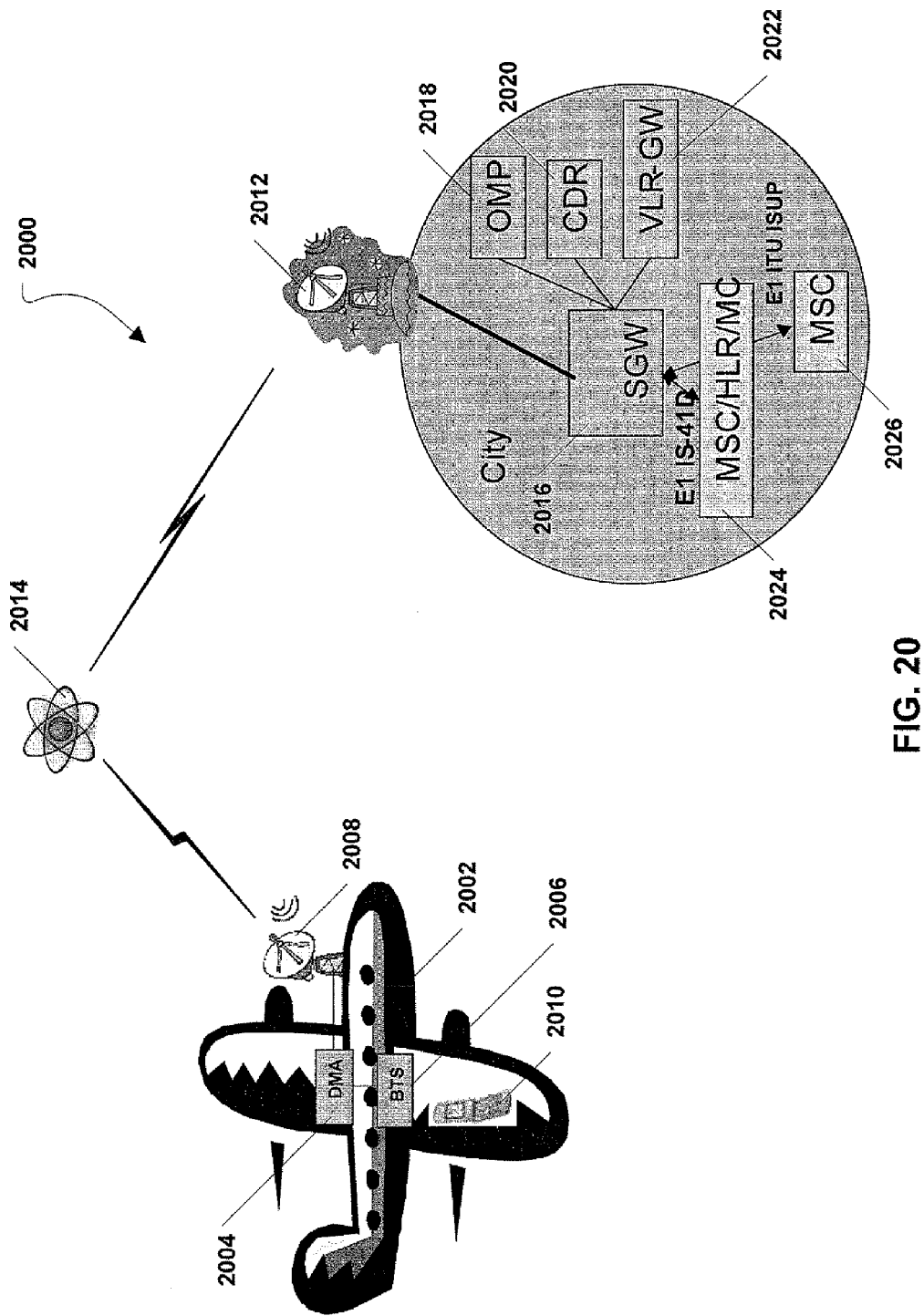
FIG. 20 is a diagram of a mobile communication system in which a distributed management architecture server can be deployed via an airplanes.

FIG. 20 illustrates yet another embodiment of a communications system, designated 2000. As shown, the system 2000 includes an airplane 2002 in which a DMA server 2004 is installed. As shown, the DMA server 2004 is coupled to a BTS 2006 and a first satellite transceiver 2008. FIG. 20 also shows a mobile communication device 2010 within the airplane 2002. The mobile communication device 2010 can be in wireless communication with the BTS 2006.

In a particular embodiment, the first satellite transceiver 2008 can communicate with a second satellite transceiver 2012 via a satellite 2014. As shown, the second satellite transceiver 2012 can be connected to a terrestrial server gateway 2016, e.g. a DMA server gateway, that can provide connectivity to an operations and management platform (OMP) 2018, a call detail record (CDR) 2020, and a visitor location register gateway (VLR-GW) 2022. The OMP 2018, the CDR 202, and the VRL-GW 2022 can be separate from or incorporated within the server gateway 2016. FIG. 20 further shows that the server gateway 2016 can be connected to a first mobile switching center (MSC) 2024 that is coupled to a second MSC 2026.

Accordingly, the system 2000 shown in FIG. 20 can allow a user in the airplane 2002 to communicate with a ground based telephone. For example, the mobile communication device 2010 can communicate with the BTS 2006, which, in turn, can communicate with the first satellite transceiver 2008 via the DMA server 2004. Further, the first satellite transceiver 2008 can transmit the call to a ground based communication system via the second satellite transceiver 2012 and the satellite 2014.

FIG. 20 shows a single airplane, however, multiple airplanes can be configured as described herein to provide communication from multiple airplanes to ground based telephones. Further, airplane to airplane communication can be provided. Additionally, the system 2000 can include other airborne vehicles, e.g., blimps.

Figure 21:
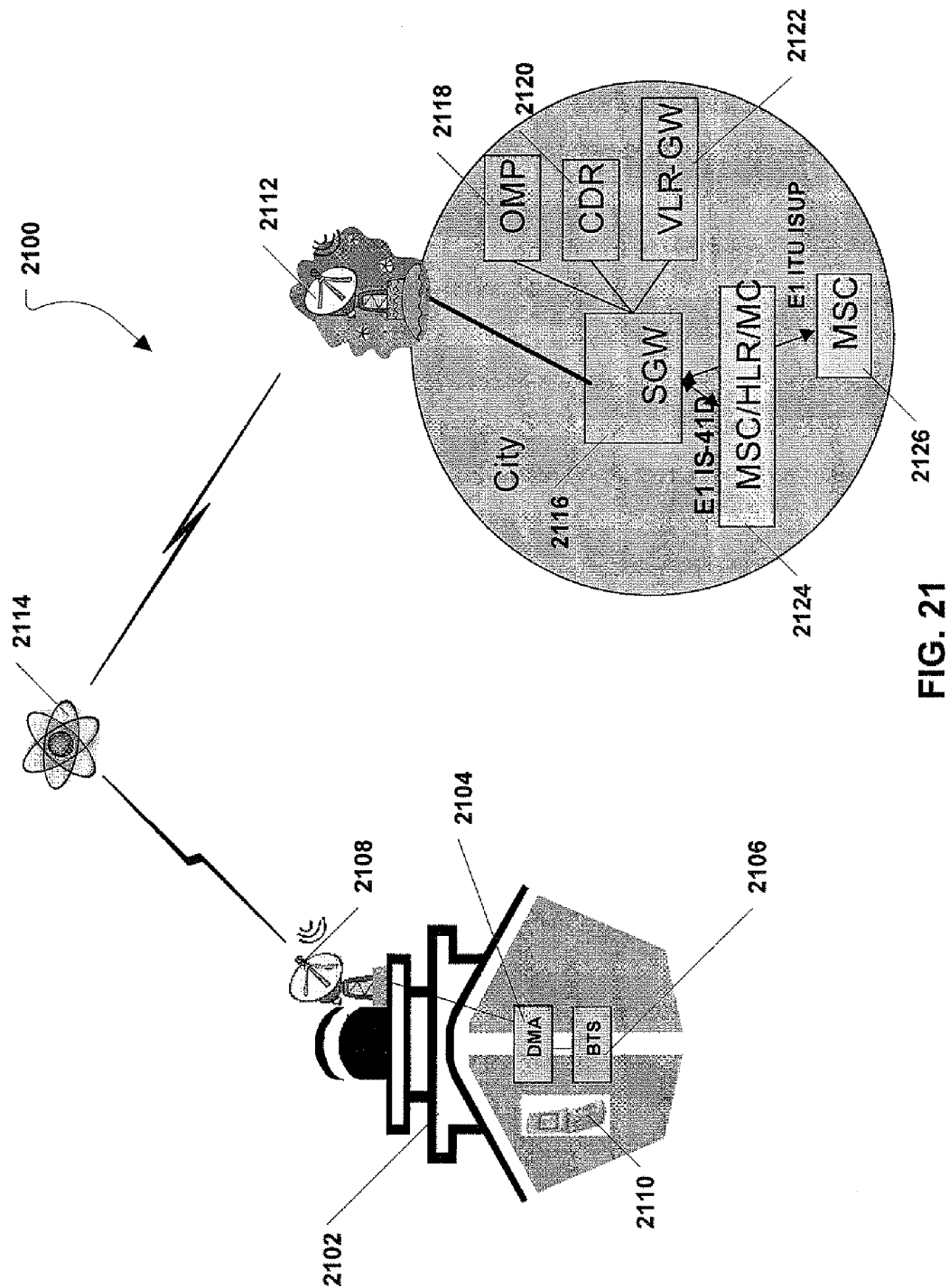
FIG. 21 is a diagram of a mobile communication system in which a distributed management architecture server can be deployed via a ship.

FIG. 21 illustrates yet another embodiment of a communications system, designated 2100. As shown, the system 2100 includes a ship 2102 in which a DMA server 2104 is installed. As shown, the DMA server 2104 is coupled to a BTS 2106 and a first satellite transceiver 2108. FIG. 21 also shows a mobile communication device 2110 within the ship 2102. The mobile communication device 2110 can be in wireless communication with the BTS 2106.

In a particular embodiment, the first satellite transceiver 2108 can communicate with a second satellite transceiver 2112 via a satellite 2114. As shown, the second satellite transceiver 2112 can be connected to a terrestrial server gateway 2116, e.g. a DMA server gateway, that can provide connectivity to an operations and management platform (OMP) 2118, a call detail record (CDR) 2120, and a visitor location register gateway (VLR-GW) 2122. The OMP 2118, the CDR 212, and the VRL-GW 2122 can be separate from or incorporated within the server gateway 2116. FIG. 21 further shows that the server gateway 2116 can be connected to a first mobile switching center (MSC) 2124 that is coupled to a second MSC 2126.

Accordingly, the system shown in FIG. 2100 can allow a user within the ship 2102 to communicate with a ground based telephone. For example, the mobile communication device 2110 can communicate with the BTS 2106, which, in turn, can communicate with the first satellite transceiver 2108 via the DMA server 2104. Further, the first satellite transceiver 2108 can transmit the call to a ground based communication system via the second satellite transceiver 2112 and the satellite 2114.

FIG. 21 shows a single ship, however, multiple ships can be configured as described herein to provide communication from multiple ships to ground based telephones. Further, ship to ship communication can be provided. Additionally, the system 2100 can include other waterborne vehicles.

Figure 22:
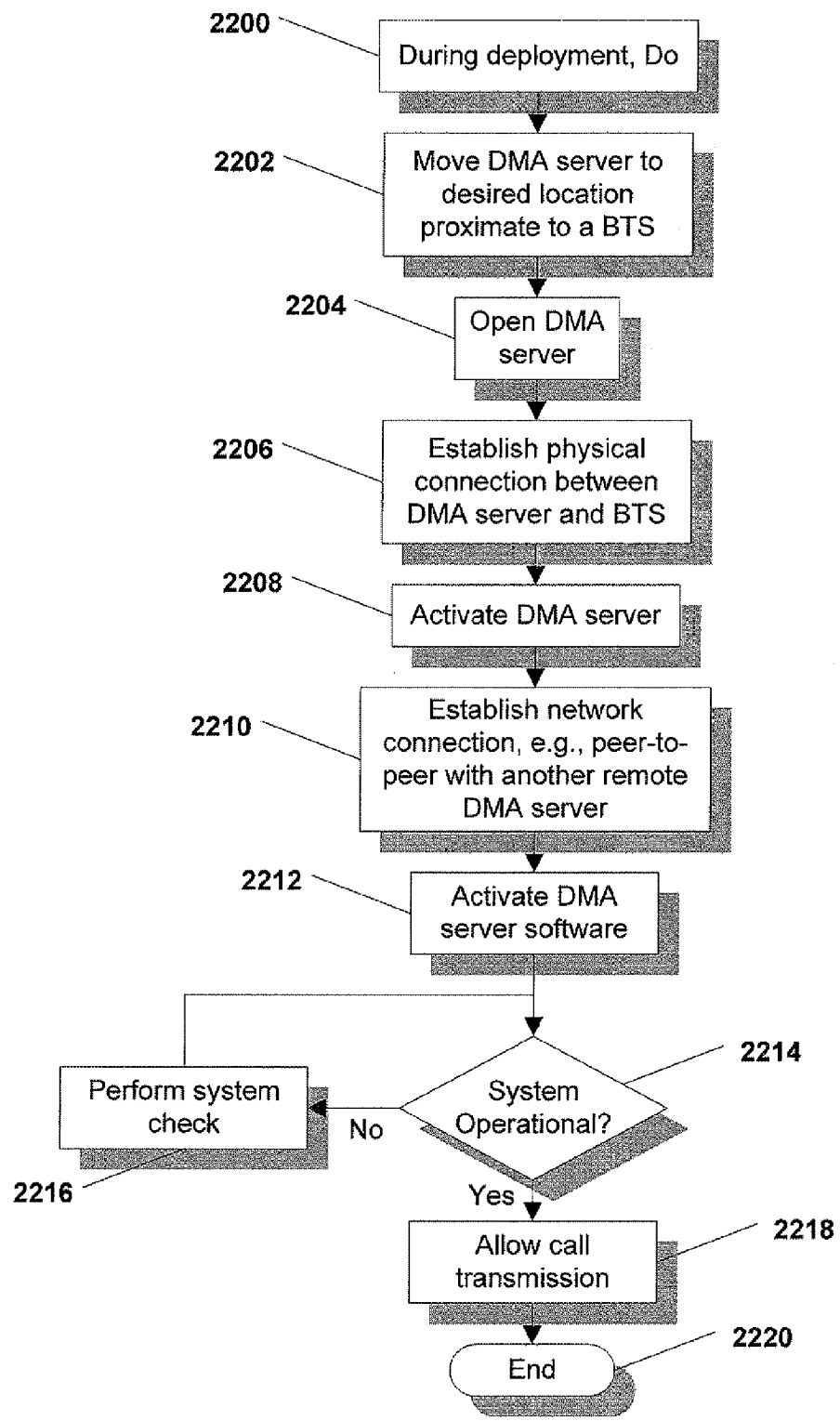
FIG. 22 is a flow chart to illustrate a method of deploying a distributed management architecture server.

Referring to FIG. 22, a method of deploying a distributed management architecture server is shown and commences at block 2200 wherein during deployment, the succeeding steps are performed. At block 2202, the DMA server is moved to a desired location proximate to a BTS. Moving to block 2204, the DMA server is opened. For example, if the DMA server is the DMA server shown in FIG. 1, the latch is unlocked and the lid is rotated about the hinges into the open position. Proceeding to block 2206, a physical connection is established between the DMA server and the BTS, e.g., the BTS is coupled to the DMA server via a wire.

Continuing to block 2208, the DMA server is activated, e.g., powered on. At block 2210, a network connection is established with another remote DMA server. In a particular embodiment, the network connection is a peer-to-peer connection between the DMA servers. Moving to block 2212, DMA server software within the DMA server is activated. Thereafter, at decision step 2214, it is determined whether the system is operational. That decision can be a performed by the DMA server, e.g., by a self-diagnostic routine or module within the DMA server. Alternatively, that decision can be determined manually by a technician. If the system is not operational, a system check is performed at block 2216. In a particular embodiment, the system check performed at block 2216 is performed by a self-diagnostic routine or module within the DMA server. On the other hand, a technician can perform the system check. After the system check, the logic then returns to decision step 2214 and continues as described herein. At decision step 2214, if the system is operational, the method proceeds to block 2218 and call transmission is allowed. The method then ends at state 2220.

Figure 23:
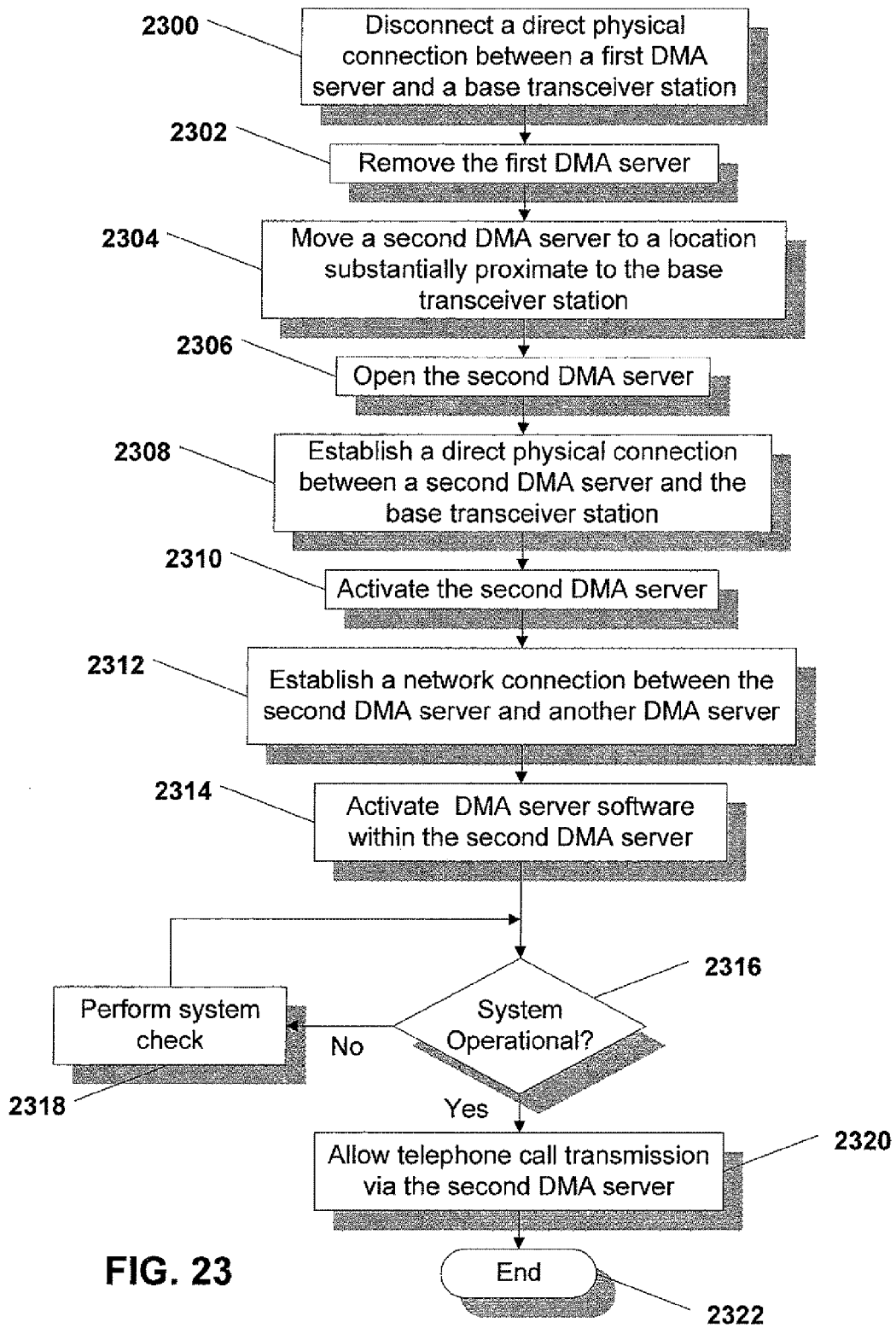
FIG. 23 is a flow chart to illustrate a method of replacing a distributed management architecture server.

Referring to FIG. 23, a method of deploying a distributed management architecture server is shown and commences at block 2300 wherein a direct physical connection between a first DMA server and a base transceiver station is disconnected. At block 2302, the first DMA server is removed. Proceeding to block 2304, a second DMA server is moved to a location that is substantially proximate to the base transceiver station. At block 2306, the second DMA server is opened. For example, if the DMA server is the DMA server shown in FIG. 1, the latch is unlocked and the lid is rotated about the hinges into the open position. Next, at block 2308, a direct physical connection is established between the second DMA server and the base transceiver station.

Continuing to block 2310, the second DMA server is activated. At block 2312, a network connection is established between the second DMA server and another remote DMA server. In a particular embodiment, the network connection is a peer-to-peer IP connection between the DMA servers. Further, in a particular embodiment, the peer-to-peer connection is established via a private IP network. At block 2314, DMA server software within the second DMA server is activated.

Proceeding to decision step 2316, it is determined whether the system is operational. That decision can be a performed by the second DMA server, e.g., by a self-diagnostic routine or module within the second DMA server. Alternatively, the decision can be determined manually by a technician. If the system is not operational, a system check is performed at block 2318. In a particular embodiment, the system check performed at block 2318 is performed by a self-diagnostic routine or module within the second DMA server. On the other hand, a technician can perform the system check. After the system check, the logic then returns to decision step 2316 and continues as described herein. At decision step 2316, if the system is operational, the method proceeds to block 2320 and call transmission is allowed via the second DMA server. The method then ends at state 2322.

With the configuration of structure described above, the present disclosure provides a flexible telecommunications device, i.e., the DMA server 406 (FIG. 4), that is distributive and associative, i.e., it can operate stand-alone or seamlessly within an existing cellular or other network. Moreover, the DMA server 406 can be integrated with virtually any third party base station. The DMA server 406 can operate with multiple air interfaces including CDMA IS-95, CDMA 1X, CDMA EVDO, GSM, GPRS, W-CDMA, 802.11 (Wi-fi), 802.16 (Wi-fi), etc. Further, the DMA server 406 can provide integrated prepaid billing, OAMP, network management, and AAA functionality. The DMA server 406 can include a Java based user interface and feature configuration system. Also, the DMA server 406 can provide real time call metering, call detail record (CDR) generation, and real time call provisioning. The DMA server 406 may be implemented in a relatively small footprint and has a relatively low power requirement. Further, the DMA server 406 may be implemented using inexpensive and widely available computer equipment.

With one or more of the deployment configurations described above, the present system provides mobile to landline calls from mobile handsets within a DMA server cellular coverage area. Also, mobile to landline calls can be made from mobile handsets roaming into DMA coverage areas. Mobile to mobile calls can be made from home/roaming handsets to DMA handsets and vice versa. Further, mobile to IP calls and IP to mobile calls can be made from within a DMA server coverage area. IP to IP calls can be made from any DMA handset to any IP phone. Additionally, IP to landline calls and landline to IP calls can be made from a DMA handset to any phone. Further, land-line to mobile calls to DMA handsets can be made.

The systems described above can support call forwarding, call waiting, 3-way calling caller ID, voice mail and mobile to mobile SMS service, i.e., text messaging. Further, the systems described above can provide broadcast SMS service, mobile to land high-speed IP data (1X or GPRS) service and mobile-to-mobile high speed IP data (1X or GPRS) service. Also, the systems described above can provide IP-PBX capability.

Further, one or more of the illustrated systems can provide IP transport between distributed elements, e.g., DMA servers 406 (FIG. 4). Packet back-haul from BTS to RAN can be provided. Further, the control logic within the DMA servers 406 (FIG. 4) can be distributed and associated. Associated systems can be redundant, self-healing, self-organizing, and scalable. Distributed systems can be "snap-together," i.e., a DMA server 406 (FIG. 4) can be linked to a previously deployed DMA server 406 (FIG. 4) in order to broaden, or otherwise extend, cellular coverage. Further, distributed systems can be de-centralized to avoid single points of failure.

One or more of the systems described above can also provide soft and softer call handoffs on the same frequency interfaces. Also, soft handoffs can be provided on different systems. Further, a DMA based system can operate standalone with a billing system provided by a DMA server and CDR generation. Or, a system can use the SS7 network to pass CDRs to a central switch for integrated billing and operation with an existing network.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A communication apparatus, comprising:
   a wireless transceiver; and
   a computer readable storage medium, comprising:
      a base station controller (BSC) module; and
      a mobile switching center (MSC) module, wherein the MSC module includes an authentication, authorization, and accounting (AAA) module, the AAA module configured to support generation of call detail records at the communication apparatus,
   wherein the communication apparatus is adapted to provide a wireless communication path to one or more mobile devices, and wherein the communication apparatus has a volume less than 150,000 centimeters cubed.

2. The communication apparatus of claim 1, wherein the AAA module is further adapted to wirelessly transmit the call detail records to a destination.

3. The communication apparatus of claim 2, wherein at least one subscriber to a wireless communication service is billed from the destination.

4. The communication apparatus of claim 1, wherein the communication apparatus has a footprint area that is less than 5,000 centimeters squared.

5. The communication apparatus of claim 1, wherein the communication apparatus has a weight that is less than 50 kilograms.

6. The communication apparatus of claim 1, wherein the communication apparatus has a volume less than 16,000 centimeters cubed.

7. The communication apparatus of claim 6, wherein the communication apparatus has a footprint area that is less than 4,000 centimeters squared.

8. The communication apparatus of claim 6, wherein the communication apparatus has a weight that is less than 20 kilograms.

9. The communication apparatus of claim 1, wherein the communication apparatus has a volume less than 6,000 centimeters cubed.

10. The communication apparatus of claim 9, wherein the communication apparatus has a footprint area that is less than 800 centimeters squared.

11. The communication apparatus of claim 9, wherein the communication apparatus has a weight that is less than 6 kilograms.

12. The communication apparatus of claim 1, wherein the communication apparatus is operable from negative twenty degrees Celsius to positive fifty five degrees Celsius.

13. The communication apparatus of claim 1, further comprising:
   a home location register (HLR) module; and
   a visitor location register (VLR) module.

14. A portable communication apparatus, comprising:
   a wireless transceiver; and
   a computer readable storage medium, comprising:
      a base station controller (BSC) module; and
      a mobile switching center (MSC) module, wherein the MSC module includes an authentication, authorization, and accounting (AAA) module, the AAA module configured to support generation of call detail records at the portable communication apparatus and to bill at least one subscriber directly from the portable communication apparatus,
   wherein the portable communication apparatus is adapted to provide a wireless communication path to one or more mobile devices, and wherein the portable communication apparatus has a volume less than 150,000 centimeters cubed.

15. The portable communication apparatus of claim 14, wherein the computer readable storage medium stores administrative information corresponding to one or more wireless telephone device subscribers.

16. The portable communication apparatus of claim 15, further comprising a gateway to a public switched telephone network and a media gateway.

17. The portable communication apparatus of claim 16, further comprising a packet data serving node (PDSN) gateway.

18. The portable communication apparatus of claim 17, wherein the MSC module further comprises:
   a simple Internet phone gateway;
   a signaling system seven (SS7) gateway; and
   a gatekeeper module coupled to the public switched telephone network gateway, the media gateway, the PDSN gateway, a Session Initiation Protocol gateway, and the AAA module.

19. The portable communication apparatus of claim 16, further comprising a Gateway GPRS Support Node (GGSN).

20. The portable communication apparatus of claim 19, wherein the MSC module further comprises:
   a simple Internet phone gateway;
   a signaling system seven (SS7) gateway; and
   a gatekeeper module coupled to the public switched telephone network gateway, the media gateway, the GGSN gateway, a Session Initiation Protocol gateway, and the AAA module.

21. The portable communication apparatus of claim 20, wherein the BSC module comprises:
   a cellular radio network controller;
   a cellular selection/distribution unit;
   a call protocol controller, wherein the call protocol controller communicates with the wireless transceiver; and
   an operations, maintenance, and provisioning (OMP) module.

22. A portable communication apparatus, comprising:
   a wireless transceiver; and
   a computer readable storage medium, comprising:
      a base station controller (BSC) module; and
      a mobile switching center (MSC) module, wherein the MSC module includes an authentication, authorization, and accounting (AAA) module, the AAA module configured to support generation of call detail records at the portable communication apparatus,
   wherein the portable communication apparatus is adapted to provide one or more wireless communication services to one or more mobile devices when the portable communication apparatus is in motion, and wherein the portable communication apparatus has a volume less than 150,000 centimeters cubed.

23. The portable communication apparatus of claim 22, wherein the portable communication apparatus is adapted to be mounted in a vehicle.

24. The portable communication apparatus of claim 22, wherein the portable communication apparatus is adapted to be carried like a briefcase.

* * * * *